(12) United States Patent
Church et al.

(10) Patent No.: US 7,769,804 B2
(45) Date of Patent: Aug. 3, 2010

(54) SERVER SIDE SEARCH WITH MULTI-WORD WORD WHEELING AND WILDCARD EXPANSION

(75) Inventors: Kenneth W. Church, Seattle, WA (US); Timothy D. Sharpe, Redmond, WA (US); Bo Thiesson, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 320 days.

(21) Appl. No.: 11/333,486

(22) Filed: Jan. 17, 2006

(65) Prior Publication Data

US 2007/0168469 A1    Jul. 19, 2007

(51) Int. Cl.
    G06F 15/16    (2006.01)
(52) U.S. Cl. .................. 709/203; 709/217; 709/219; 707/5; 707/10
(58) Field of Classification Search ............. 709/203, 709/217, 219; 707/5, 7, 10
See application file for complete search history.

(56) References Cited

U.S. PATENT DOCUMENTS

| | | | |
|---|---|---|---|
| 5,303,150 A | | 4/1994 | Kameda |
| 5,386,556 A | | 1/1995 | Hedin et al. |
| 5,485,372 A | | 1/1996 | Golding et al. |
| 5,655,129 A | | 8/1997 | Ito |
| 5,734,749 A | * | 3/1998 | Yamada et al. .............. 382/187 |
| 5,832,478 A | * | 11/1998 | George .......................... 707/3 |
| 5,926,652 A | * | 7/1999 | Reznak ....................... 712/300 |
| 5,963,671 A | | 10/1999 | Comerford et al. |
| 6,408,266 B1 | | 6/2002 | Oon |
| 6,490,563 B2 | * | 12/2002 | Hon et al. .................... 704/260 |
| 6,556,990 B1 | * | 4/2003 | Lane ............................ 707/6 |
| 6,564,213 B1 | | 5/2003 | Ortega et al. |
| 6,573,844 B1 | | 6/2003 | Venolia et al. |
| 6,654,733 B1 | | 11/2003 | Goodman et al. |
| 6,687,734 B1 | | 2/2004 | Sellink et al. |
| 6,785,677 B1 | * | 8/2004 | Fritchman .................... 707/6 |
| 6,801,190 B1 | | 10/2004 | Robinson |
| 7,107,204 B1 | * | 9/2006 | Liu et al. ...................... 704/2 |
| 7,236,923 B1 | * | 6/2007 | Gupta .......................... 704/9 |
| 7,277,029 B2 | * | 10/2007 | Thiesson et al. ............. 341/22 |

(Continued)

FOREIGN PATENT DOCUMENTS

EP    0924594    6/1999

(Continued)

OTHER PUBLICATIONS

International Search Report dated Sep. 28, 2007 for PCT Application Serial No. PCT/US2007/008570, 7 Pages.

(Continued)

*Primary Examiner*—Lashonda T Jacobs
(74) *Attorney, Agent, or Firm*—Hope Baldauff Hartman LLC

(57) ABSTRACT

The claimed subject matter provides systems and/or methods that expand input data. An interface can obtain input data and a wildcard insertion component can modify the input data to include at least one implicit wildcard inserted at an end of each intended word. Additionally, an expansion component can generate a candidate list of expanded data based at least in part on the input data including the at least one implicit wildcard utilizing a language model that provides likely expansions of wildcards. Further, the expansion component can evaluate the input data at a server side.

23 Claims, 25 Drawing Sheets

U.S. PATENT DOCUMENTS

| | | | |
|---|---|---|---|
| 7,349,981 | B2 | 3/2008 | Guerrero |
| 7,383,299 | B1* | 6/2008 | Hailpern et al. .............. 709/203 |
| 7,505,985 | B2 | 3/2009 | Kilroy |
| 7,617,205 | B2 | 11/2009 | Bailey et al. |
| 2002/0099536 | A1* | 7/2002 | Bordner et al. ............... 704/10 |
| 2002/0116528 | A1 | 8/2002 | Vale |
| 2002/0123994 | A1 | 9/2002 | Schabes et al. |
| 2003/0061027 | A1* | 3/2003 | Weise et al. ..................... 704/9 |
| 2004/0201607 | A1* | 10/2004 | Mulvey et al. .............. 345/708 |
| 2004/0260534 | A1* | 12/2004 | Pak et al. ........................ 704/7 |
| 2004/0267737 | A1 | 12/2004 | Takazawa et al. |
| 2005/0144064 | A1 | 6/2005 | Calabria et al. |
| 2005/0283468 | A1 | 12/2005 | Kamvar et al. |
| 2006/0047701 | A1 | 3/2006 | Maybury et al. |
| 2006/0085392 | A1 | 4/2006 | Wang et al. |
| 2006/0123338 | A1* | 6/2006 | McCaffrey et al. .......... 715/531 |
| 2006/0163337 | A1 | 7/2006 | Unruh |
| 2006/0290535 | A1* | 12/2006 | Thiesson et al. .............. 341/22 |
| 2007/0011154 | A1 | 1/2007 | Musgrove et al. |
| 2007/0136256 | A1 | 6/2007 | Kapur et al. |
| 2007/0143262 | A1 | 6/2007 | Kasperski |
| 2007/0164782 | A1* | 7/2007 | Church et al. ................. 326/41 |
| 2007/0185859 | A1 | 8/2007 | Flowers et al. |
| 2007/0255552 | A1* | 11/2007 | Thiesson et al. ............... 704/8 |
| 2007/0282811 | A1 | 12/2007 | Musgrove |
| 2008/0052152 | A1 | 2/2008 | Yufik |
| 2008/0071740 | A1 | 3/2008 | Jhala et al. |
| 2008/0140519 | A1* | 6/2008 | Thiesson et al. .............. 705/14 |
| 2009/0055386 | A1* | 2/2009 | Boss et al. ....................... 707/5 |
| 2009/0063404 | A1* | 3/2009 | Hacigumus et al. ............ 707/2 |

FOREIGN PATENT DOCUMENTS

| | | |
|---|---|---|
| WO | 0182119 | 1/2001 |

OTHER PUBLICATIONS

Lee Wang, et al. Detecting dominant locations from search queries, SIGIR '05, Aug. 15-19, 2005, Salvador, Brazil.

Junyan Ding, et al. Computing geographical scopes of web resources, Proceedings of the 26th VLDB Conference, Cairo, Egypt, 2000.

J. L. Bentley. Multidimensional binary search trees used for associative searching, Commun. ACM, 18:9, pp. 509-517, 1975.

S.T. Dumais, et al. Stuff I've Seen: A system for personal information retrieval and re-use, SIGIR, 2003.

M. D. Mcilroy. Development of a spelling list, IEEE Trans. on Communications 30, pp. 91-99, 1982.

M. Mohri, et al. Weighted Finite-State Transducers in Speech Recognition. Computer Speech and Language, 16(1), pp. 69-88, 2002.

Using the Word Wheel, Technical Tips, http://www.isys-search.com/support/techtips/wordwheel.html, last accessed Jun. 23, 2005.

MSN Desktop Search (beta), http://www.pcmag.com/article2/0,1759,1771841,00.asp, last accessed Jun. 23, 2005.

F. Jelinek. Statistical Methods for Speech Recognition. pp. 60-67, 1997.

I. H. Witten, et al. Managing Gigabytes: Compressing and Indexing Documents and Images, by Morgan Kaufmann Publishing, San Francisco, 1999, pt. 1, 65 pages, (front cover-36).

I. H. Witten, et al. Managing Gigabytes: Compressing and Indexing Documents and Images, by Morgan Kaufmann Publishing, San Francisco, 1999, pt. 2, 65 pages, (37-101).

I. H. Witten, et al. Managing Gigabytes: Compressing and Indexing Documents and Images, by Morgan Kaufmann Publishing, San Francisco, 1999, pt. 3, 65 pages, (102-166).

I. H. Witten, et al. Managing Gigabytes: Compressing and Indexing Documents and Images, by Morgan Kaufmann Publishing, San Francisco, 1999, pt. 4, 55 pages, (167-221).

I. H. Witten, et al. Managing Gigabytes: Compressing and Indexing Documents and Images, by Morgan Kaufmann Publishing, San Francisco, 1999, pt. 5, 48 pages, (222-270).

I. H. Witten, et al. Managing Gigabytes: Compressing and Indexing Documents and Images, by Morgan Kaufmann Publishing, San Francisco, 1999, pt. 6, 58 pages, (271-328).

I. H. Witten, et al. Managing Gigabytes: Compressing and Indexing Documents and Images, by Morgan Kaufmann Publishing, San Francisco, 1999, pt. 7, 60 pages, (329-388).

I. H. Witten, et al. Managing Gigabytes: Compressing and Indexing Documents and Images, by Morgan Kaufmann Publishing, San Francisco, 1999, pt. 8, 65 pages, (389-452).

I. H. Witten, et al. Managing Gigabytes: Compressing and Indexing Documents and Images, by Morgan Kaufmann Publishing, San Francisco, 1999, pt. 9, 67 pages, (453-back cover).

U.S. Official Action dated Feb. 5, 2010 in U.S. Appl. No. 11/332,954.

U.S. Official Action dated Mar. 13, 2007 in U.S. Appl. No. 11/159,711.

U.S. Notice of Allowance / Allowability dated Jun. 25, 2007 in U.S. Appl. No. 11/159,711.

U.S. Official Action dated Sep. 24, 2009 in U.S. Appl. No. 11/332,954.

U.S. Official Action dated Oct. 6, 2008 in U.S. Appl. No. 11/608,631.

U.S. Official Action dated Apr. 29, 2009 in U.S. Appl. No. 11/608,631.

U.S. Official Action dated Sep. 4, 2009 in U.S. Appl. No. 11/608,631.

Church et al., "The Wild Thing", Jun. 2005, Proceedings of the ACL Poster and Demonstration Sessions, pp. 93-96.

U.S. Official Action dated Apr. 9, 2010 in U.S. Appl. No. 11/332,954.

U.S. Official Action dated Apr. 6, 2010 in U.S. Appl. No. 11/608,631.

* cited by examiner

SERVER SIDE SEARCH WITH MULTI-WORD WORD WHEELING AND WILDCARD EXPANSION

CROSS-REFERENCE TO RELATED APPLICATIONS

This application is related to U.S. Pat. No. 7,277,029, filed Jun. 23, 2005, entitled, "USING LANGUAGE MODELS TO EXPAND WILDCARDS" and co-pending U.S. patent application Ser. No. 11/332,954, filed Jan. 17, 2006, entitled, "MULTI-WORD WORD WHEELING".

BACKGROUND

Technological advances in computer hardware, software and networking have lead to efficient, cost effective computing systems (e.g., desktop computers, laptops, handhelds, cellular telephones, servers, . . . ) that can communicate with each other from essentially anywhere in the world in order to exchange information. These systems continue to evolve into more reliable, robust and user-friendly systems. Advances have enabled these computing systems to be employed to access, browse and search the Internet, compose, send and receive email messages, view and edit documents, transmit and obtain text messages and/or instant messages, as well as perform numerous other actions. For instance, a user can employ a cellular telephone and/or a personal digital assistant (PDA) to search the Internet for movie times and invite a friend to a particular showing by sending an email, text message, or instant message.

As these systems continue to develop, various techniques have been employed in connection with inputting information. Some of the first computing systems received input by utilizing punch cards and paper tape. More recently, improvements have enabled providing information to such devices by using a keyboard, a mouse, a touch sensitive screen, a pen device, optical character recognition, speech recognition, and the like. For example, conventional systems oftentimes employ keyboards, which can vary in size depending upon the type of device. Pursuant to an illustration, a personal computer or laptop computer can employ a keyboard based on a QWERTY layout where each alphanumeric character can be associated with a respective key, while a cellular telephone can include fewer keys such that a number of alphabetic characters share a single key with a numeric character. For instance, a "2" key on a cellular telephone keypad is commonly associated with the letters "A", "B", and "C".

Currently, a number of techniques can be utilized to input text with a limited keyboard, where ambiguity can exist due to more than one alphanumeric character being associated with a particular key. For instance, a multiple-tap approach can be employed such that a user presses a numeric key a number of times to enter a desired letter or number. By way of illustration, the "2" key can be pressed once to input the number 2, twice to input the letter A, three times to input the letter B, and four times to input the letter C. A pause and/or pressing a key that moves a cursor such as an arrow key can help differentiate between distinct alphanumeric characters. Such a technique, however, is commonly time consuming and inefficient for a user since a single key may be pressed a number of times to enter a single alphanumeric character.

Another common approach to enter text with numeric keys is a single-tap approach, where the user presses the numeric key associated with a desired letter once. Thereafter, the inputted characters are disambiguated, for example, by matching a sequence of characters corresponding with a word to a sequence stored in memory. By way of illustration, to enter the word "cell" a user could press the sequence 2-3-5-5, which can be compared to stored sequences in memory. Even though the single-tap approach offers a more efficient manner in which to enter text, it is associated with a number of drawbacks. In particular, the input for the single-tap approach can remain ambiguous; thus, additional user input is commonly required to resolve such ambiguity. According to the above illustration, the input sequence 2-3-5-5 can match the sequence associated with the word "cell" as noted as well as the key sequence related to the word "bell". Hence, additional input is commonly needed to differentiate between such ambiguous possibilities.

Thus, conventional systems lacking a full keyboard are oftentimes associated with inefficient and time-consuming techniques to input data. In addition to the above noted difficulties associated with limited keyboards, devices such as PDAs commonly utilize a form of handwriting with which data input can be inefficient and/or slow. Moreover, even when a keyboard is available, a user may be a poor speller and/or may not be familiar with appropriate and/or popular inputs.

SUMMARY

The following presents a simplified summary in order to provide a basic understanding of some aspects described herein. This summary is not an extensive overview of the claimed subject matter. It is intended to neither identify key or critical elements of the claimed subject matter nor delineate the scope thereof. Its sole purpose is to present some concepts in a simplified form as a prelude to the more detailed description that is presented later.

The claimed subject matter relates to systems and/or methods that facilitate expanding input data. The input data can include explicit wildcard(s) and/or can have implicit wildcard(s) inserted therein. The wildcard(s) can thereafter be expanded utilizing a language model. For instance, the k-best expansions can be provided as suggestions. One or more of the suggestions can be selected, for instance, to perform a search, to enter text into a document and/or a message (e.g., text message, instant message, email, . . . ), etc. According to an example, input data can be associated with any number of intended words. Each of the intended words can be expanded based at least in part upon a language model such that a candidate list can be generated, and selections can be made form this candidate list.

In accordance with various aspects of the claimed subject matter, an expansion component can generate a candidate list of expanded data based at least in part on input data that is obtained. The expansion component can utilize a language model to provide likely expansions of wildcards associated with the input data. It is to be appreciated that the input data can be generated by any type of input device. For instance, a desktop computer, a laptop, a handheld, a cellular telephone, a server, etc. can provide the input data. Further, the input data can include alphabetic data, numerical data (e.g., input utilizing a keypad of a cellular telephone), voice data, handwriting data, a combination thereof, etc. Additionally, the input data can be converted to an appropriate form (e.g., to comprise alphabetic characters).

Pursuant to one or more aspects of the claimed subject matter, implicit wildcard(s) can be inserted into input data that can be obtained. The implicit wildcard(s) can be placed at any location within the input data. For instance, the implicit wildcard(s) can be inserted at a beginning and/or an end of the input data. Additionally or alternatively, the implicit wildcard(s) can be included before and/or after intended words within the input data.

According to various aspects of the claimed subject matter, an expansion of wildcard(s) (e.g., explicit and/or implicit) can be effectuated at a server side. The server side application can enable computationally lightweight and fast retrieval of wildcard completions. Further, expansions can be effectuated that consider location data. For instance, a language model can be employed such that location related expansions can be associated with a higher relevance.

The following description and the annexed drawings set forth in detail certain illustrative aspects of the claimed subject matter. These aspects are indicative, however, of but a few of the various ways in which the principles of such matter may be employed and the claimed subject matter is intended to include all such aspects and their equivalents. Other advantages and novel features will become apparent from the following detailed description when considered in conjunction with the drawings.

DETAILED DESCRIPTION

Figure 1:
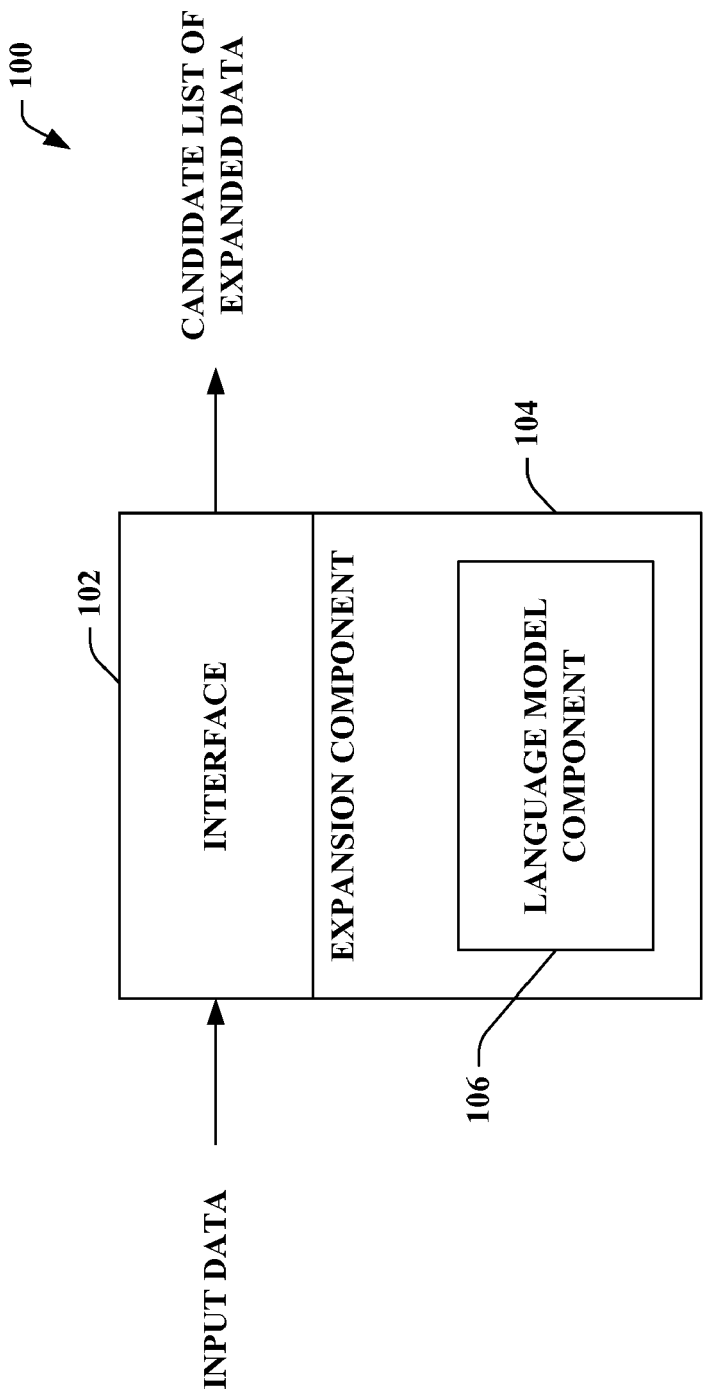
FIG. 1 illustrates a block diagram of an exemplary system that expands input data.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," "interface," and the like are intended to refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips, . . . ), optical disks (e.g., compact disk (CD), digital versatile disk (DVD), . . . ), smart cards, and flash memory devices (e.g., card, stick, key drive, . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Now turning to the figures, FIG. 1 illustrates a system 100 that expands input data. The system 100 can include an interface 102 that obtains input data and an expansion component 104 that generates a candidate list of expanded data utilizing the input data. The interface 102 can receive the input data from any type of input device (not shown). For instance, the input data can be generated by a personal computer, a laptop, a handheld, a cellular telephone, a server, etc. It is to be appreciated that the interface 102 and/or the expansion component 104 can be coupled to the input device, can be wholly or partially comprised within the input device, and/or can be stand alone components.

Any type of input data can be received by the interface 102. Pursuant to an example, when a user employs a personal computer, the interface 102 can obtain alphanumeric characters associated with keys depressed by the user. Additionally, voice recognition can be employed to analyze a user's spoken input and/or handwriting recognition can be utilized to identify written data; thus, the interface 102 can receive audile and/or visual data. By way of further illustration, the interface 102 can receive numeric characters associated with a cellular telephone keypad, where each of the numeric characters can be related to a number of alphanumeric characters.

The input data can include one or more explicit wildcards. The wildcard(s) can be represented by a "*"; however, any disparate representation of the wildcards falls within the scope of the claimed subject matter (e.g., any other character can be utilized as the wildcard instead of *, a sound, a mark, . . . ). The explicit wildcards can be included anywhere within the input data. Thus, for example, the input "Linc*n" can be typed with a keyboard associated with a personal computer and can be provided to the interface 102 if a user desires to enter the word "Lincoln". According to another illustration, a user can vocalize "m-star-t" and this input data can be provided to the expansion component 104, which can utilize voice recognition to identify the input data as "m*t". It is to be appreciated that the claimed subject matter is not limited to such examples.

After obtaining the input data, the interface 102 can provide the input data to the expansion component 104. The expansion component 104 can include a language model component 106 that enables employment of a language model that provides likely expansions of wildcards associated with the input data. Thus, by utilizing the language model, the expansion component 104 can expand the explicit wildcards associated with the input data to generate a candidate list of expanded data. Additionally or alternatively, the expansion component 104 can insert implicit wildcards into the input data; these implicit wildcards can similarly be expanded via employing the language model. The language model can be utilized to find the k-best expansions.

Conventional systems can allow for a user to enter text by way of a limited keypad. Suppose that a user desires to search for "MSN" utilizing a cell phone. A standard approach employing multiple-taps could be to type 6 <pause> 777 <pause> 66, where 6 yields M, 777 produces S, and 66 represents N. Another multiple-tap approach could utilize typing 66 <pause> 7777 <pause> 666 such that 66 can represent M, 7777 can be associated with S, and 666 can be related to N. If the pauses were not included in a multiple-tap approach, then the input data would be ambiguous. Single-tap techniques can alternatively be employed. Thus, an input of 676 (for MSN) can be utilized to find the k-best matches, and thereafter the user can select MSN from this list. Pursuant to this example, 676 can represent [6MNOmno] [7PRSprs] [6MNOmno]. However, conventional systems fail to expand implicit and/or explicit wildcards that can be located anywhere within the input data utilizing a language model.

The language model component 106 can employ any language model. For instance, a trigram language model can be utilized. Additionally, restricted language models can be employed. Pursuant to an example, a language model utilized for web queries can be based on a list of queries and probabilities associated therewith. According to another example, a language model built upon syllabic elements can be employed in connection with expanding the implicit and/or explicit wildcard(s). Pursuant to a further example, a language model utilized by the language model component 106 can be frequently updated to enable timely identification of breaking news stories.

Although the interface 102 is depicted as being separate from the expansion component 104, it is contemplated that the expansion component 104 can include the interface 102 or a portion thereof. Also, the interface 102 can provide various adapters, connectors, channels, communication paths, etc. to enable interaction with the expansion component 104.

The expansion component 104 yields a candidate list of expanded data, which can thereafter be utilized. For instance, the candidate list can be displayed to the user (e.g., via the interface 102) and/or the user can make a selection from the candidate list. The selected expansion from the candidate list can be utilized in connection with performing a search, can be entered into a document or message being composed, can be inserted in an address bar, etc. It is contemplated that the interface 102 can provide the candidate list of expanded data (e.g., to a user, to an input device, . . . ) as shown. Additionally or alternatively, the expansion component 104 or a disparate component (not shown) can output the candidate list. For instance, the candidate list can include the k-best expansions.

According to another example, the candidate list can include the five most frequently utilized expansions, a mixture of the three most frequently employed expansions and another two of the top ten most utilized expansions, and/or sponsored recommendation(s); however, the claimed subject matter is not limited to these examples.

Figure 2:
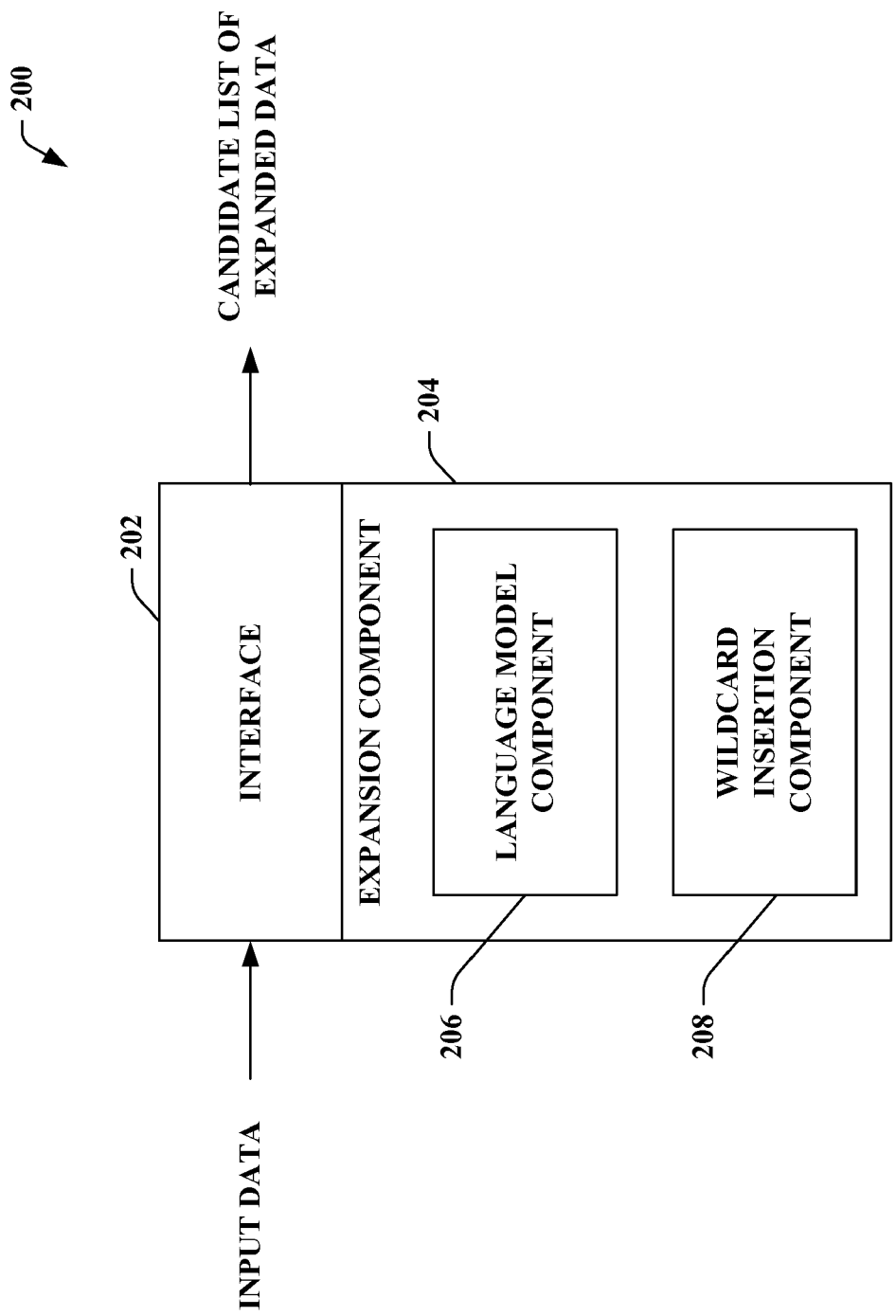
FIG. 2 illustrates a block diagram of an exemplary system that inserts implicit wildcards into input data.

Turning to FIG. 2, illustrated is a system 200 that inserts implicit wildcards into input data. The system 200 includes an interface 202 that receives input data and provides the input data to an expansion component 204. The expansion component 204 can expand the input data to yield a candidate list of expanded data. For instance, the k-best expansions can be generated with the expansion component 204. The expansion can be effectuated, at least in part, utilizing a language model provided by a language model component 206.

The expansion component 204 can additionally comprise a wildcard insertion component 208 that can insert one or more implicit wildcards into the input data. It is to be appreciated that the wildcard insertion component 208 can position implicit wildcards anywhere in the input data. Subsequent to the insertion of the implicit wildcards, the implicit wildcards as well as any explicit wildcards in the input data can be expanded based on the language model.

According to an example, the wildcard insertion component 208 can identify an end of an intended word within the input data. Pursuant to this example, the wildcard insertion component 208 can insert a wildcard at this identified location. It is to be appreciated that a number of such locations can be determined and therefore any suitable number of implicit wildcards can be included with the input data. By way of illustration, the wildcard insertion component 208 can locate the ends of intended words by identifying spaces and insert an implicit wildcard before each of the spaces within the input data. Additionally or alternatively, the wildcard insertion component 208 can place an implicit wildcard at the end of the input data.

The wildcard insertion component 208 can also insert implicit wildcards in other locations within the input data. For instance, an implicit wildcard can be included at a beginning of the input data via utilizing the wildcard insertion component 208. Additionally or alternatively, the wildcard insertion component 208 can place an implicit wildcard at a beginning of each of the intended words of the input data.

The following illustrates exemplary input data (left hand side) and corresponding expanded data (right hand side) that can be generated utilizing the expansion component 204, language model component 206 and/or the wildcard insertion component 208:

n y c→New York City
Cin OH→Cincinnati Ohio
Arn S*w*g→Arnold Schwarzenegger

According to the first example, the wildcard insertion component 208 can insert implicit wildcards after the "n", "y", and "c". A language model can be employed to provide likely expansions of these wildcards, thereby yielding "New York City" as an expanded output. The third example demonstrates that explicit wildcards can be included in the input data. Thus, these explicit wildcards along with implicit wildcards located after the "n" and after the "g" can be expanded to generate "Arnold Schwarzenegger" as an expanded output.

Utilization of the wildcard insertion component 208 (as well as the expansion component 204) can provide for a number of advantages over conventional techniques. In particular, the wildcard insertion component 208 and/or the expansion component 204 can enable word wheeling. Thus, users can input data on a mobile device such as a cellular telephone or a PDA with limited keyboard capabilities, which can be associated with inefficient and/or time-consuming input of alphanumeric characters; however, the claimed subject matter is not so limited. Additionally, word wheeling can compensate for a user not knowing a correct spelling of an intended input. Further, word wheeling can assist a user that only has a vague idea of queries to input (e.g., in a web search context) or that is curious about what is currently popular and accordingly match a partial input.

Figure 3:
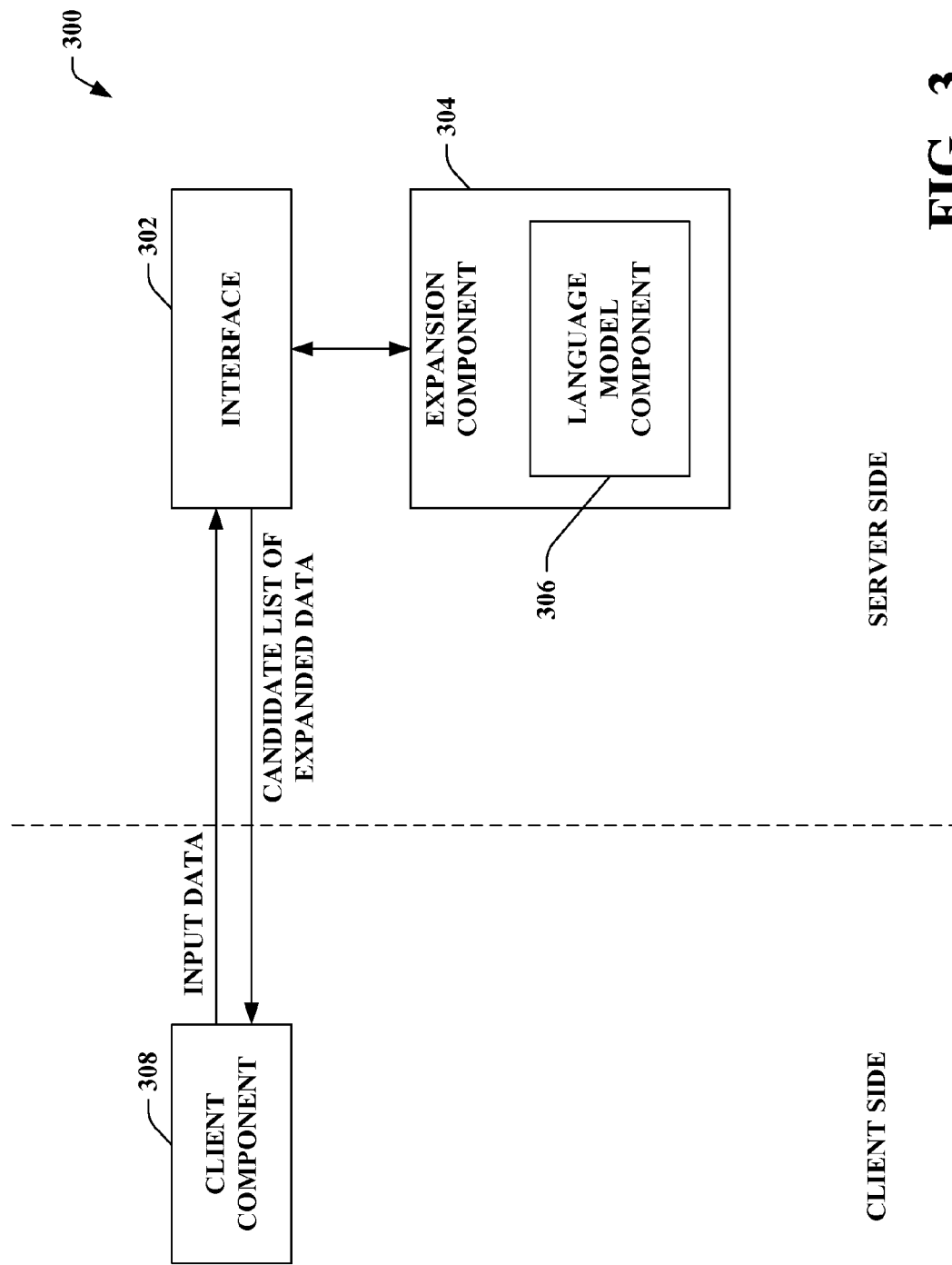
FIG. 3 illustrates a block diagram of an exemplary system that performs a server side expansion of input data.

With reference to FIG. 3, illustrated is a system 300 that performs a server side expansion of input data. The system 300 can include an interface 302 that receives input data and/or transmits a candidate list of expanded data. The interface 302 can provide the input data to an expansion component 304 that expands explicit and/or implicit wildcards. The expansion component 304 can generate the k-best expansions associated with the input data utilizing a language model component 306. Although not depicted, it is to be appreciated that a wildcard insertion component (e.g., wildcard insertion component 208 of FIG. 2) can additionally be employed in connection with system 300.

The system 300 further includes a client component 308 that communicates with the interface 302. The client component 308 and the interface 302 can be coupled via any type of connection. By way of illustration and not limitation, the input data and/or the candidate list of expanded data can be transferred via a wired connection, wireless connection, a combination thereof, or any disparate type of connection. The client component 308 can be, for example, a desktop computer, a laptop, a handheld, a cellular telephone, and the like.

By way of illustration, the client component 308 can be a mobile device such as a cellular telephone. Utilizing the keypad associated with the cellular telephone, input data can be entered and thereafter transferred to the interface 302. The k-best expansions of the input data can be generated by the expansion component 304. The expansion component 304 can evaluate the input data utilizing a language model to produce a set of expanded data where a wildcard (e.g., implicit and/or explicit) associated with the input data can be replaced with at least one alphanumeric character for at least one of the expansions of the set. Thereafter, the resultant candidate list of expanded data can be provided back to the client component 308.

The server side implementation associated with system 300 can employ computationally lightweight and/or fast retrieval of wildcard (and/or phone numeric key) completions, whereas a small memory footprint may not be necessary. In order to accomplish fast retrieval of wildcard completions, a suffix tree in which suffixes are sorted by both popularity and alphabetic order, alternating on even and odd depth in the tree, can be employed by the expansion component 304. Additionally or alternatively, if fast retrieval is not an issue (e.g., if many servers are available to complete the wildcards), then the actual data structure utilized for the language model can be less important. Thus, if enough computing power is available, the wildcard completion can be accomplished via employing a simple regular expression matching over an ordered list of possible entries.

The following illustrates an example of the expansion component 304 utilizing indexing and/or compression in connection with generating the candidate list of expanded data. In association with the k-best string matching, various types of language models can be employed. For example, a trigram language model and/or long lists (e.g., for finite languages such as the 7 million most popular web queries) can be utilized. The long lists can be indexed with a suffix array. Suffix arrays can be generalized to a phone mode. The list of web queries can be treated as a text of N bytes. (New lines can be replaced with end-of-string delimiters). The suffix array, S, can be a sequence of N integers. The array can be initialized with the numbers from 0 to N−1. Thus, S[i]=i, for $0 \leq i < N$. Each of these integers can represent a string, starting at position i in the text and extending to the end of the string. S can then be sorted alphabetically.

Suffix arrays can make it easy to find the frequency and location of any ngram (substring). For example, given a substring such as "mail", the first and last suffix that starts with "mail" can be found and the gap between these two can be the frequency. Additionally, each suffix in the gap can point to a super-string of "mail."

To generalize suffix arrays for phone mode, for instance, alphabetical order (strcmp) can be replaced with phone order (phone-strcmp). Both strcmp and phone-strcmp can consider each character one at a time. In standard alphabetic ordering, 'a'<'b'<'c', but in phone-strcmp, the characters that map to the same key on the phone keypad can be treated as equivalent.

Suffix arrays can be generalized to take advantage of popularity weights. Thus, instead of finding all queries that contain the substring "mail," the k-best (e.g., most popular) can be identified. The standard suffix array method can work by adding a filter on the output to search over the results for the k-best. However, this filter could take O(N) time if there are a large number of matches.

As an improvement, the suffix array can be sorted by both popularity and alphabetic ordering such that even and odd depths alternate in the tree. At the first level, the suffix array can be sorted by the first order, then sorted by the second order, and so on. When searching a node ordered by alphabetical order, standard suffix array techniques can be utilized. Additionally, when searching a node ordered by popularity, the more popular half can be searched before the second half. If there are a large number of matches, as is common for short strings, the index can make it easy to find the top-k quickly, and thus, the second half may not need to be searched. If the prefix is rare, then both halves can be searched, and therefore, half the splits (e.g., those split by popularity) can be useless for the worse case, where the input substring does not match anything in the table. Lookup is O(sqrt N).

Wildcard matching can be different from substring matching. Finite state machines are a good way to consider the k-best string matching problem with wildcards. For example, the input string often includes long anchors of constants (e.g., wildcard free substrings). Suffix arrays can use these anchors to generate a list of candidates that are then filtered by a regular expression package.

Memory can be limited in many practical applications, especially in the mobile context. For a trigram model, a lossy method can be utilized. Each trigram <x,y,z> can be mapped into a hash code $h=(V^2 x + Vy + z)\% P$, where V is the size of the vocabulary and P is an appropriate prime. P trades off memory for loss. The cost to store N trigrams can be $N[1/\log_e 2 + \log_2(P/N)]$ bits. The loss, the probability of a false hit, is 1/P. The N trigrams can be hashed into h hash codes and the codes can be sorted. The differences, x, can be encoded with a Golomb code, which is an optimal Huffman code, assuming that the differences are exponentially distributed, which can be the case if the hash is Poisson.

Figure 4:
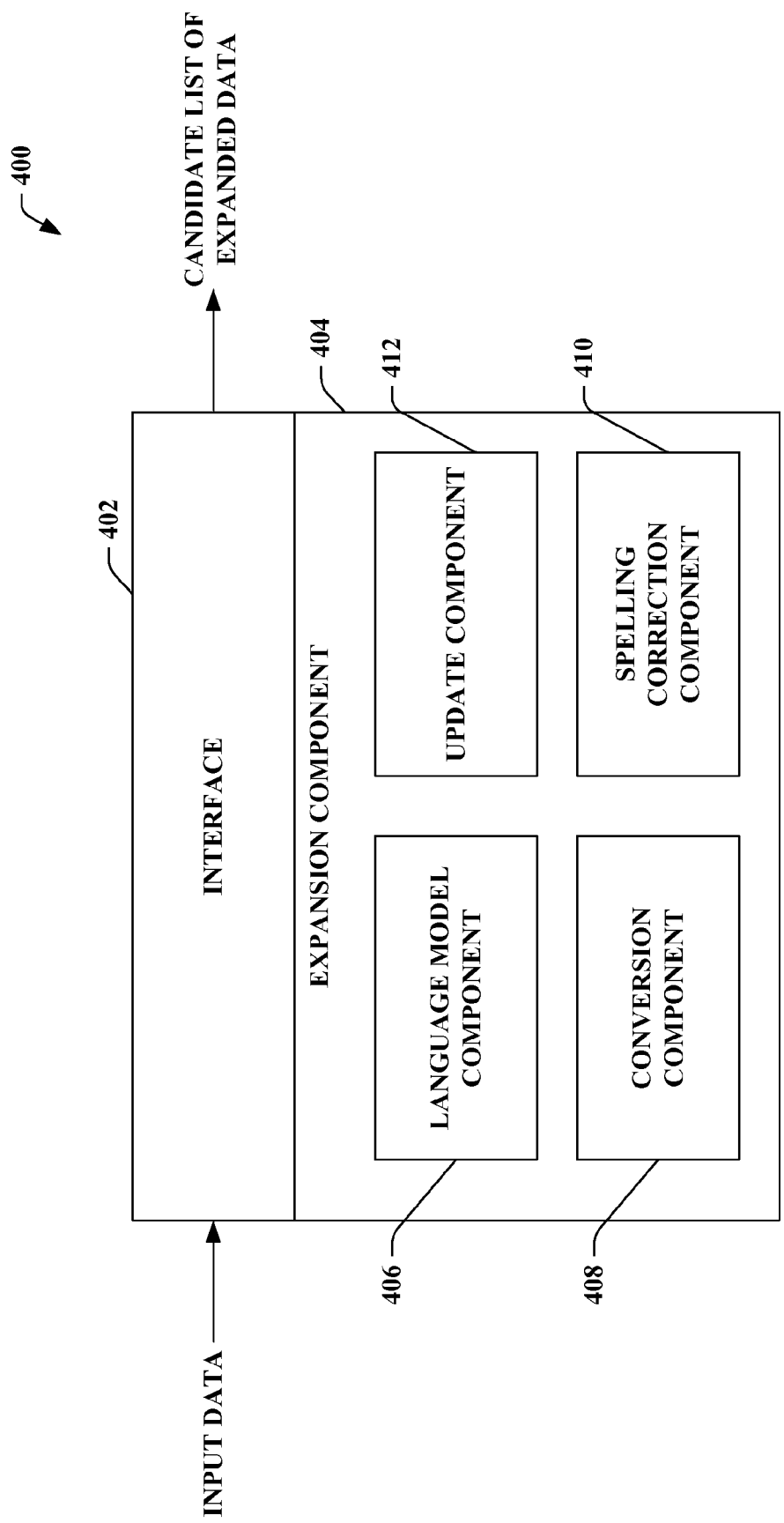
FIG. 4 illustrates a block diagram of an exemplary system that completes wildcard(s) associated with input data.

With reference to FIG. 4, illustrated is a system 400 that completes wildcard(s) associated with input data. The system 400 includes an interface 402 that receives the input data and provides the input data to an expansion component 404 that can complete wildcards associated with the input data (e.g., implicit and/or explicit wildcards). It is to be appreciated that the interface 402 and/or the expansion component 404 can be located on a server side and/or on a client side. Further, the expansion component 404 can employ a language model component 406 that can be utilized in combination with the input data to produce the expanded data.

The expansion component 404 can additionally include a conversion component 408 that converts the input data that is received by the interface 402 to corresponding alphabetic character data. The alphabetic character data can thereafter be expanded to yield the candidate list of expanded data. Additionally or alternatively, the conversion component 408 can operate upon the data subsequent to the completion of the wildcards by the expansion component 404; however, the claimed subject matter is not so limited. According to an example, the input data that is received can be numerical data that can be entered via employing a cellular telephone. The conversion component 408 can recognize that the data received was generated with the cellular telephone and convert the data to corresponding alphabetic character data. The conversion component 408 can differentiate between input data that purposefully includes numerical characters (e.g., if an input is, for instance, "T1") and input data where the numerical characters represent alphabetic characters (e.g., which can be the case when input data is generated utilizing a cellular telephone). Pursuant to another illustration, the conversion component 408 can identify the receipt of voice data and enable speech recognition to be performed. According to a further example, the conversion component 408 can determine that a handwritten input has been obtained by the interface 402 and conduct handwriting recognition to alter the input data. It is to be appreciated that the claimed subject matter is not limited to the aforementioned examples.

The expansion component 404 can also include a spelling correction component 410. The spelling correction component 410 can modify a portion or the entirety of the input data to account for a potentially spelling error. Thus, at least one of the completions of the wildcard(s) in the candidate list can be associated with the modified input data. The spelling correction component 410 can be utilized to display one or more spelling corrections to the input data. Thus, by way of example, if the input data is "mon search," the spelling correction component 410 can provide for "msn search" in the candidate list.

The expansion component 404 further can comprise an update component 412, which can dynamically update the candidate list upon entry of each character of the input data. Suggested wildcard completions can be shown dynamically with suggestions changing and/or improving as each new character is input via employing the update component 412. In such a case, a user may not have to press a "Suggest" button to obtain the candidate list. For instance, a user can input "7" and the update component 412 and/or the expansion component 404 can provide "Shopping" as part of the candidate list. Subsequently, the user can input a space followed by another "7" and the update component 412 can modify the candidate list of expanded data such that "Shopping" is no longer included, but rather "Space Needle" is presented; however, the claimed subject matter is not limited to this example.

Figure 5:
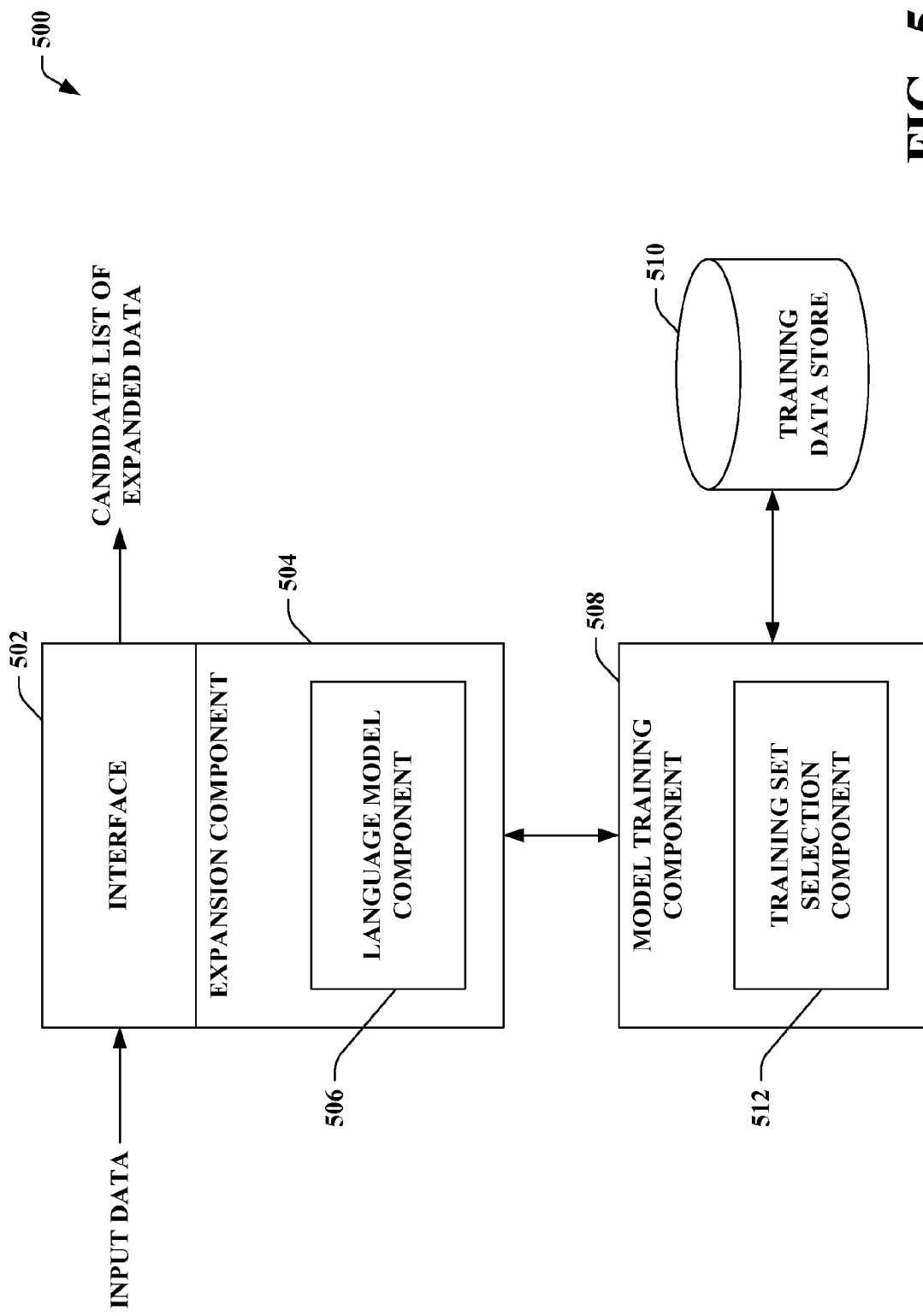
FIG. 5 illustrates a block diagram of an exemplary system that trains a language model utilized to expand input data.

FIG. 5 illustrates a system 500 that trains a language model utilized to expand input data. The system 500 includes an interface 502 and an expansion component 504. The interface 502 can receive input data and provide a candidate list of expanded data based upon an expansion performed by the expansion component 504. The expansion component 504 can further comprise a language model component 506 that can provide a language model that can be leveraged in association with generating the expanded data. It is to be appreciated that any type of language model can be utilized in connection with the claimed subject matter.

The system 500 can additionally include a model training component 508 that trains the language model based on a training set of data, which can be stored in a training data store 510. For disparate applications, the model training component 508 can employ distinct training sets. For example, for web searching the training set employed by the model training component 508 can comprise a combination of query logs and web documents. According to another example, a training set can include typical documents to train a language model when a text editor application is employed. By way of further illustration, the model training component 508 can utilize instant messaging logs to train a language model that can be employed in connection with an instant messaging application. The model training component 508 can include a training set selection component 512 that can select a particular training set of data based on an application that is being employed.

The training data store 510 can include various training sets, and an appropriate set can be identified and utilized by the training set selection component 512. The training data store 510 can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The training data store 510 of the subject systems and methods is intended to comprise, without being limited to, these and any other suitable types of memory. In addition, it is to be appreciated that the training data store 510 can be a server, a database, a hard drive, and the like.

Figure 6:
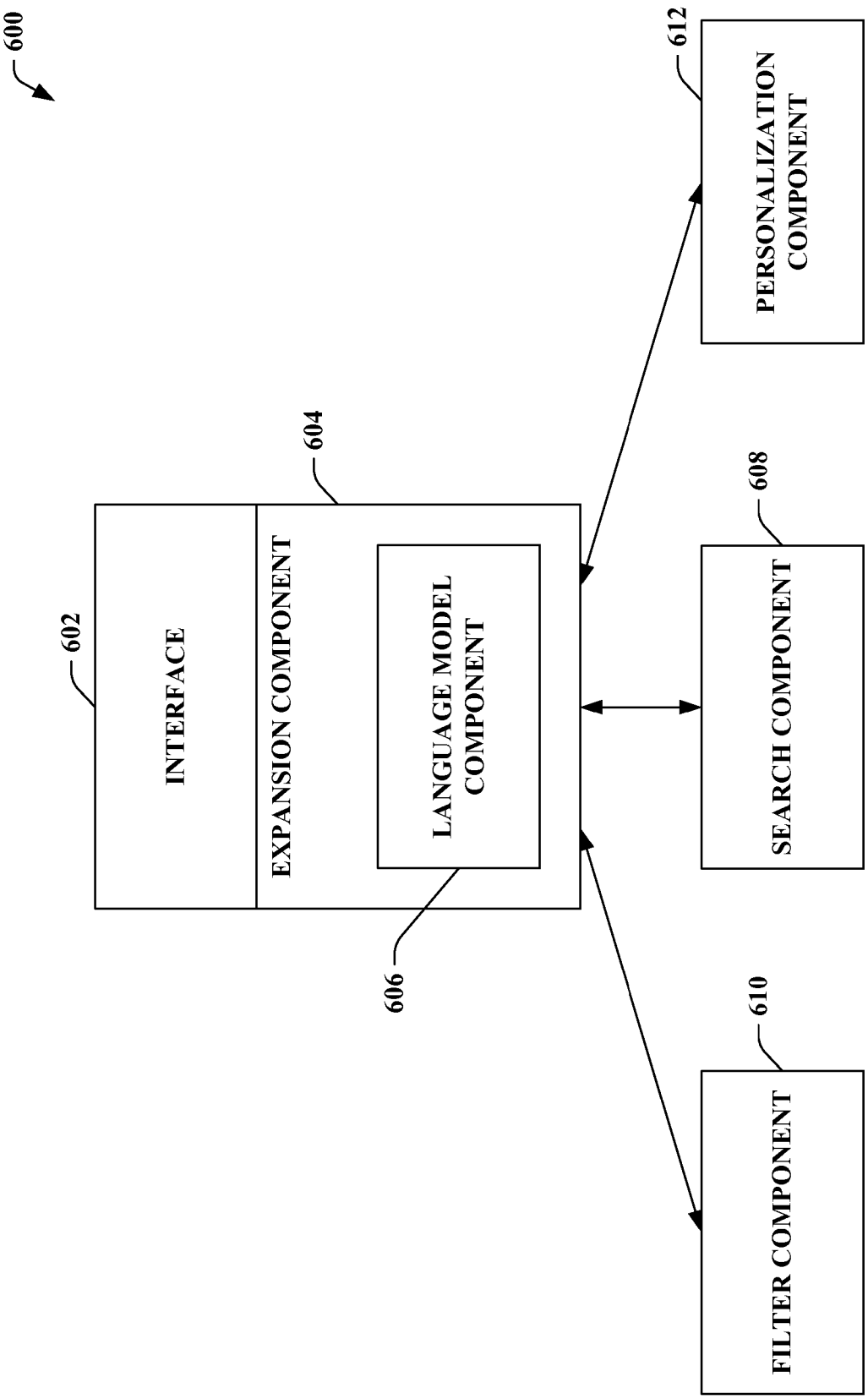
FIG. 6 illustrates a block diagram of an exemplary system that modifies and/or utilizes a candidate list generated from input data.

Turning to FIG. 6, illustrated is a system 600 that modifies and/or utilizes a candidate list generated from input data. The system 600 can include an interface 602 that can obtain input data and an expansion component 604 that identifies, inserts and/or expands wildcard(s) (e.g., implicit and/or explicit) associated with the input data. A language model component 606 that provides a language model that facilitates expanding the wildcards can be further included as part of the expansion component 604.

The system 600 can further include a search component 608 that can be coupled to the expansion component 604. For instance, the expansion component 604 can provide a candidate list of expansions related to input data. Thereafter, a particular expansion from the candidate list can be selected (e.g., by a user, by a disparate component, . . . ) and a search can be performed by the search component 608 based on the selection. For instance, the search component 608 can be associated with a search engine (not shown) such that the selection can be utilized as a search query and content related thereto can be retrieved. Additionally or alternatively, the search component 608 can be a search engine. The search component 608 can output the results related to the search (e.g., to a display component, to a user, to an input component, . . . ).

The system 600 additionally can include a filter component 610 and/or a personalization component 612. Although depicted as being coupled to the expansion component 604, it is contemplated that either or both can be coupled to the search component 608. The filter component 610 can be utilized to remove various expansions from the candidate list. For instance, an expansion that is adult in nature, vulgar, offensive, etc. can be filtered from the candidate list of the k-best suggestions by the filter component 610 and thus not shown to the user. Additionally or alternatively, an expansion that is likely to yield search results that are adult, vulgar, offensive, etc. in nature can be removed via the filter component 610. The filter component 610 can be switched on or off by a user, can be always or never operational, can effectuate filtering based on the input data and/or input device, etc.

The personalization component 612 can facilitate customizing the system 600 to a particular user. For instance, the personalization component 612 can identify the user (e.g., by way of a password, a biometric indicator, a card, a key, a location, . . . ). The personalization component 612 can alter the language model employed by the language model component 606 in connection with generating the candidate list for a particular user. Additionally or alternatively, the personalization component 612 can enable the filter component 610 to display and/or remove particular expansions based on the identity of the user. The personalization component 612 can track and/or utilize a user's preferences and/or historical data. Further, the personalization component 612 can enable training the language model (e.g., via the model training component 508 of FIG. 5) based at least in part on a desktop search index associated with the particular user.

Figure 7:
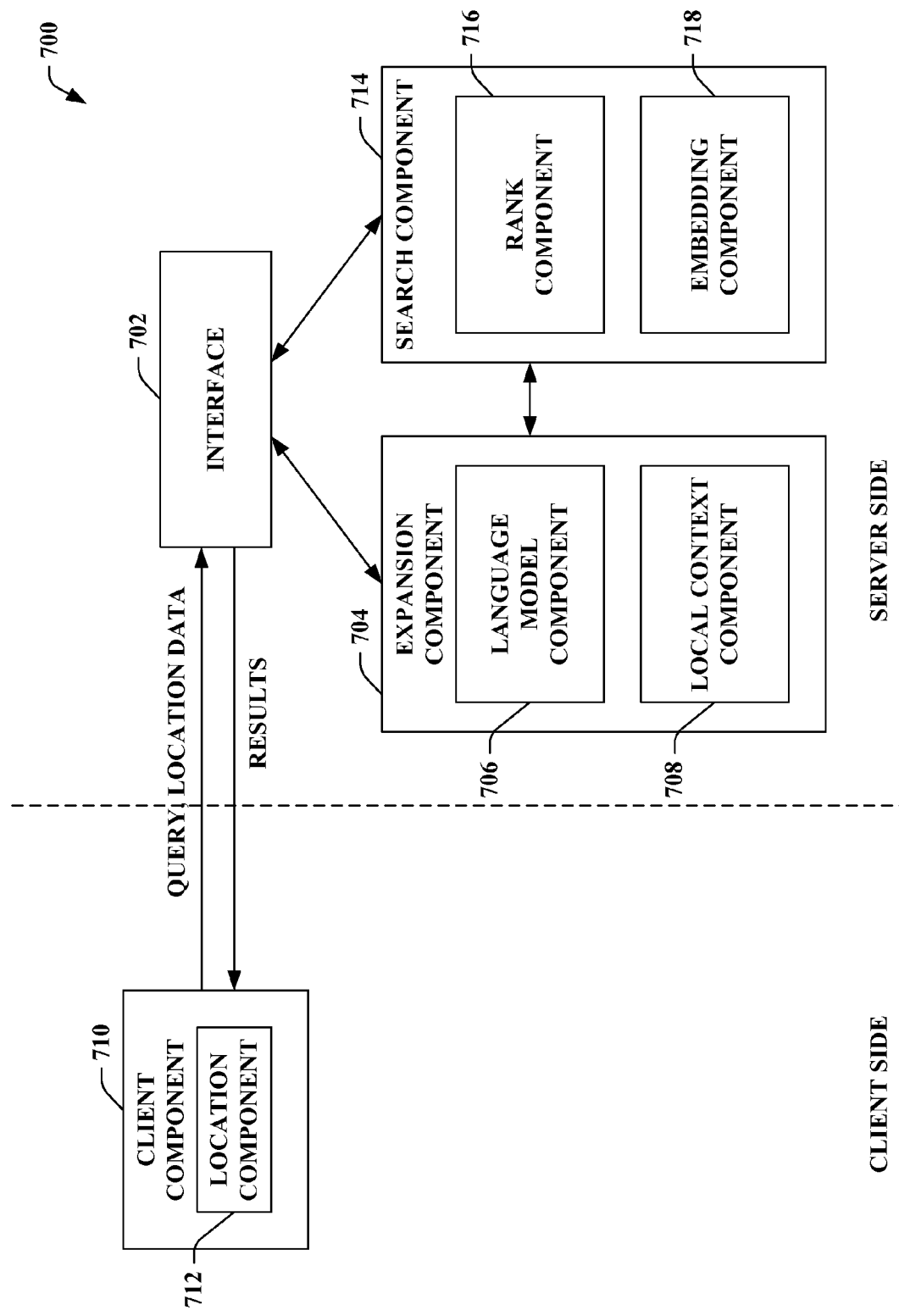
FIG. 7 illustrates a block diagram of an exemplary system that expands input data based at least in part upon a consideration of location.

With reference to FIG. 7, illustrated is a system 700 that expands input data based at least in part upon a consideration of location. The system 700 can include an interface 702 that can obtain query and/or location data, which can be provided to an expansion component 704. The expansion component 704 can further comprise a language model component 706 and a local context component 708 that can provide relevant expansions in view of the location data. When utilizing location data, the language model component 706 can employ a disparate language model as compared to when location data is not employed. For instance, the location related language model can make expansions related to places (e.g., hotels, tourist attractions, restaurants, . . . ) more dominant while people (e.g., celebrities, . . . ) can be less important. The local context component 708 can enable making completions dependant upon a location.

A client component 710 can provide the input data and/or location data to the interface 702. The client component 710 can further include a location component 712 that can identify a location associated with the client component 712. For instance, the location component 712 can employ a global positioning system (GPS) to determine the location of the client component 710. It is also contemplated that a user can input a location into the client component 710, and this data can thereafter be transmitted to a server side. Although the system 700 depicts a server side implementation for expanding wildcards utilizing location information, it is contemplated that a location based system can be employed on a client side.

The system 700 additionally can include a search component 714 that can perform a search based on one or more of the expansions in the candidate list. For example, a user can select an expansion from the candidate list (e.g., by way of making a selection with the client component 710) and the search component 714 can effectuate performing a search related to the selected expansion. Thus, intermediate query refinement can be employed such that additional input (e.g., user selection) can be provided prior to obtaining query results with the search component 714. However, it is to be appreciated that the claimed subject matter is not so limited.

The search component 714 can further comprise a rank component 716 that can rank the expansions. For instance, the most likely expansion can be displayed at a beginning of the list, at a top of a pull-down list, more prominently, etc. Although depicted as being comprised as part of the search component 714, the rank component 716 can be separate from the search component 714.

Moreover, the search component 714 can include an embedding component 718 that can include search results associated with any number of expansions along with a candidate list of the expansions. For example, the expansion component 704 can expand the input data to generate a candidate list, which can be provided to the embedding component 718. The embedding component 718 can perform a search, via employing the search component 714, related to a most likely candidate within the list. Results associated with the search can then be included along with the candidate list to the client component 710. Thus, a user of the client component 710 need not select the particular expansion to perform this search as the results can be automatically provided. The embedding component 718, for instance, can enable presenting search results for top query recommendations (e.g., expansion(s)) along with a suggested query panel that can include the candidate list of expansions.

Pursuant to an example, the client component 710 can transmit a short message service (SMS) text message to the interface 702. The SMS text message can include explicit wildcard(s) and/or can have implicit wildcard(s) inserted (e.g., by the expansion component 704, wildcard insertion component 208 of FIG. 2, . . . ). The server (e.g., via the interface 702) can transmit back a return SMS text message. The return SMS text message can include, for instance, a page (or part of the page or a resume of the page) that a top search result for a top suggested completion points to. Additionally or alternatively, the n-best search results for the m-best suggested completions can be provided as part of the return SMS text message. It is to be appreciated that the claimed subject matter is not limited to this example.

Figure 8:
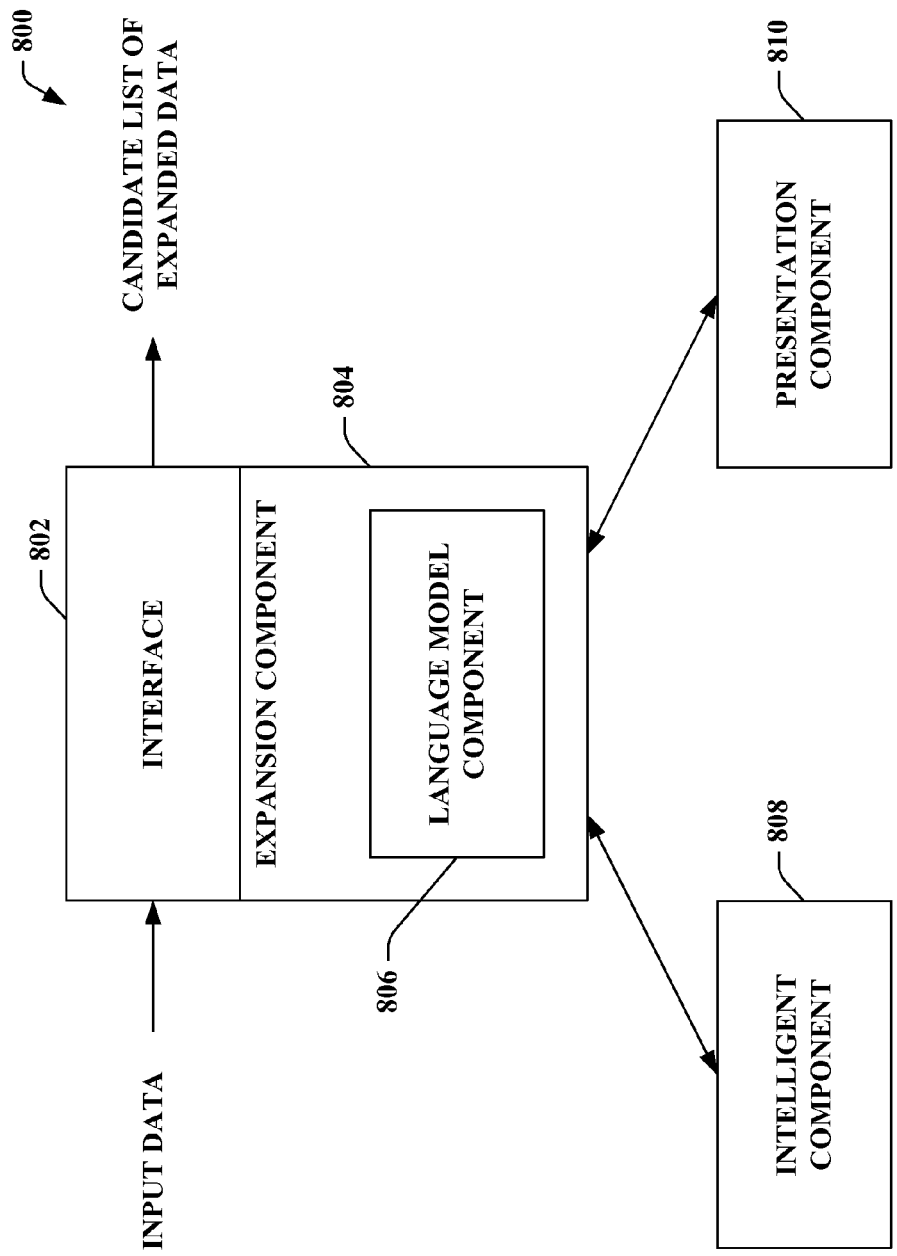
FIG. 8 illustrates a block diagram of an exemplary system that facilitates generating and/or utilizing a candidate list of expanded data.

Turning to FIG. 8, illustrated is a system 800 that facilitates generating and/or utilizing a candidate list of expanded data. The system 800 can include an interface 802, an expansion component 804, and a language model component 806, each of which can be substantially similar to respective components described above. The system 800 can further include an intelligent component 808. The intelligent component 808 can be utilized by the expansion component 804 to facilitate completing wildcards (e.g., implicit and/or explicit) associated with input data. For example, the intelligent component 808 can determine that particular expansions are commonly chosen and accordingly update a language model utilized to generate future expansions. Pursuant to another illustration, the intelligent component 808 can determine that a particular expansion is highly likely to be chosen (e.g., by a user) if displayed (e.g., timely expansion and/or result associated with breaking news); thus, the intelligent component 808 can provide the expansion and/or embedded result along with the candidate list (even if such expansion does not match the input data).

It is to be understood that the intelligent component 808 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naive Bayes, Bayesian networks, decision trees, neural networks, fuzzy logic models, and probabilistic classification models providing different patterns of independence can be employed. Classification as used herein also is inclusive of statistical regression that is utilized to develop models of priority.

A presentation component 810 can provide various types of user interfaces to facilitate interaction between a user and any component coupled to the expansion component 804. As depicted, the presentation component 810 is a separate entity that can be utilized with the expansion component 804. However, it is to be appreciated that the presentation component 810 and/or similar view components can be incorporated into the expansion component 804 (and/or the interface 802) and/or a stand-alone unit. The presentation component 810 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, edit controls, combo boxes, radio buttons, check boxes, push buttons, and graphic boxes. In addition, utilities to facilitate the presentation such vertical and/or horizontal scroll bars for navigation and toolbar buttons to determine whether a region will be viewable can be employed. For example, the user can interact with one or more of the components coupled to the expansion component 804.

The user can also interact with the regions to select and provide information via various devices such as a mouse, a roller ball, a keypad, a keyboard, a pen and/or voice activation, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can than provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

Figure 9:
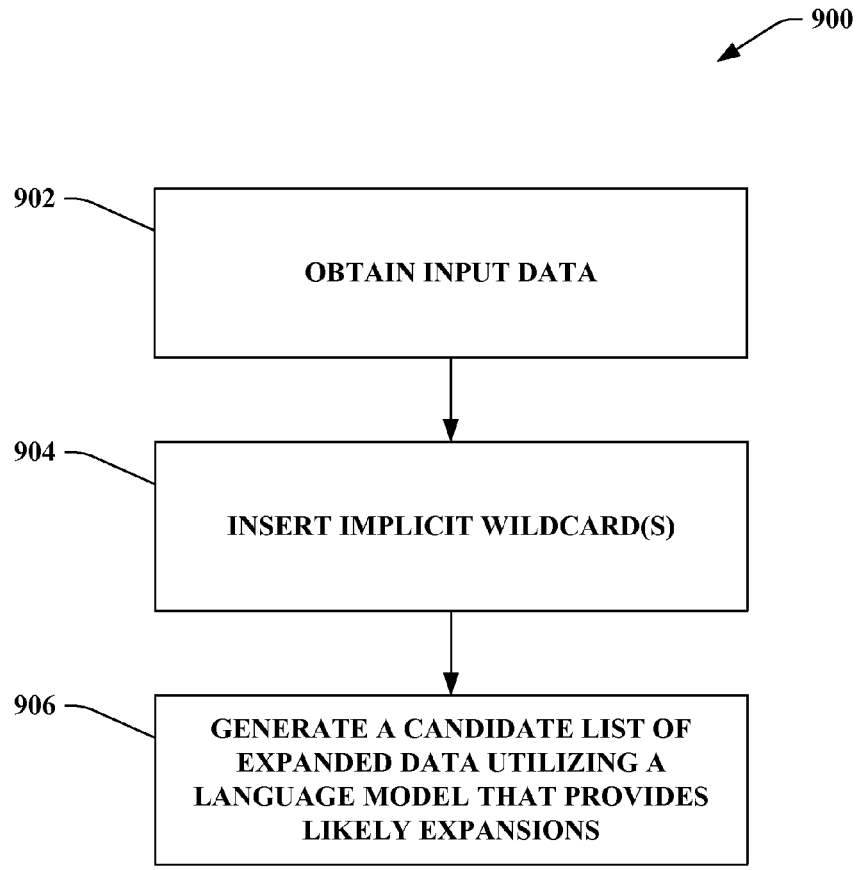
FIG. 9 illustrates an exemplary methodology that facilitates expanding input data.
Figure 10:
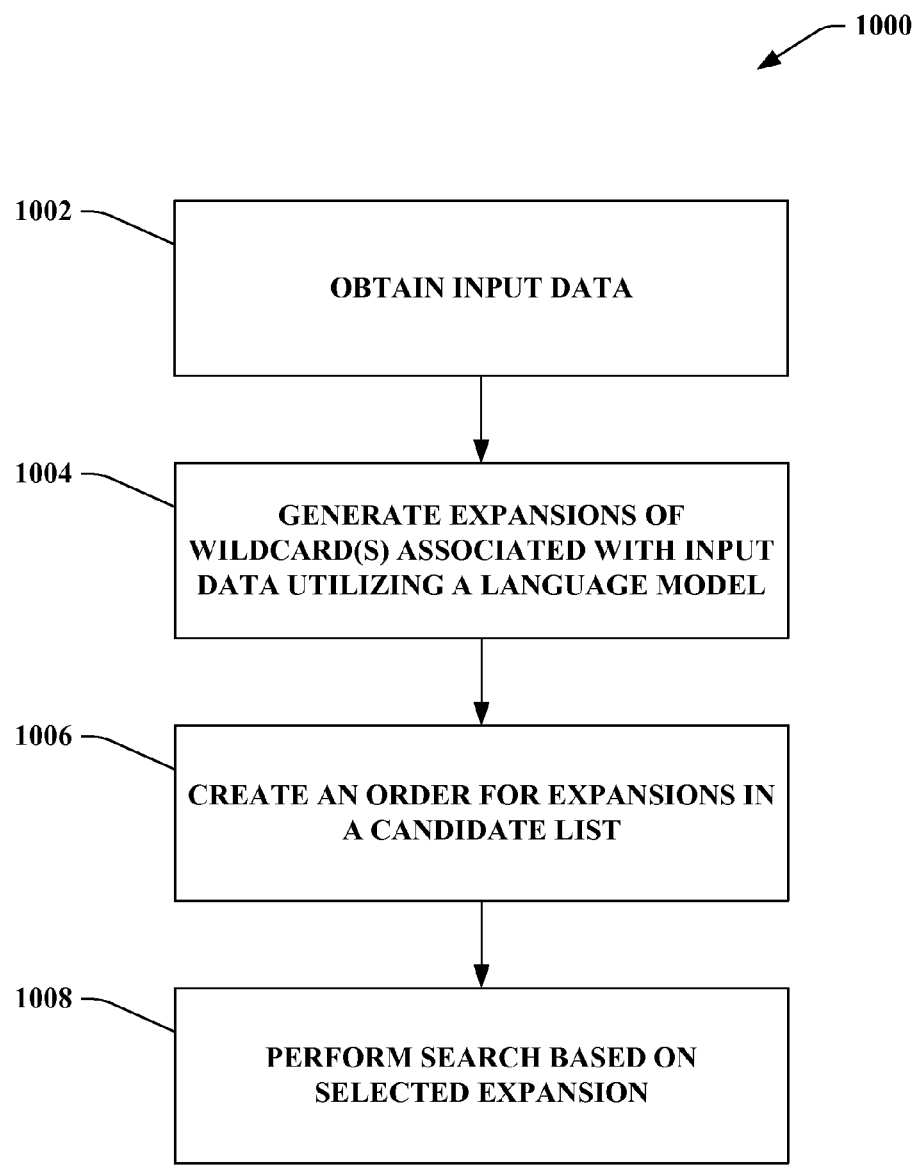
FIG. 10 illustrates an exemplary methodology that facilitates evaluating wildcard(s) associated with input data.

FIGS. 9-10 illustrate methodologies in accordance with the claimed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events.

Turning to FIG. 9, illustrated is a methodology 900 that facilitates expanding input data. At 902, input data is obtained. For instance, the input data can be received for any type of input device (e.g., a desktop computer, a laptop, a handheld, a cellular telephone, a server, . . . ). Additionally, the input data can be related to a search query, a text message (e.g., short message service (SMS) message), an instant message, a document being generated and/or edited, etc. Further, the input data can include alphabetic characters, numerical characters, handwriting data, spoken data, a combination thereof, etc. At 904, one or more implicit wildcards can be inserted into the input data. For instance, the implicit wildcards can be inserted at an end of the input data. Additionally or alternatively, the implicit wildcards can be inserted at an end of one or more intended words within the input data. By way of example, an implicit wildcard can be inserted before each space in the input data. At 906, a candidate list of expanded data is generated utilizing a language model that provides likely expansions. For instance, the k-best expansions of wildcards (e.g., implicit and/or explicit) associated with the input data can be generated. It is to be appreciated that any language model can be employed in connection with the claimed subject matter. Additionally, the candidate list can be ordered in any manner. For instance, the order can be based at least in part on popularity, alphabetical order, etc. The candidate list that is generated can be provided to a user, displayed, utilized for generating search results, etc.

With reference to FIG. 10, illustrated is a methodology 1000 that facilitates evaluating wildcard(s) associated with input data. At 1002, input data (e.g., input text, . . . ) is obtained. For example, a user can input part(s) of an intended search query. The input data can include explicit wildcard(s) provided by the user. Additionally or alternatively, implicit wildcard(s) can be inserted into the input data (e.g., at an end of each intended word within the input data). At 1004, expansions of wildcard(s) associated with the input data are generated utilizing a language model. For instance, a user can push a "Suggest" button to facilitate initializing the generation of the k-best expansions of the implicit and/or explicit wildcards associated with the input data. At 1006, an order is created for the expansions in a candidate list. By way of example, the expansions can be ordered according to popularity and/or alphabetically. Pursuant to another example, the candidate list can be displayed. According to an illustration, characters that match actual input characters (or that are disambiguated from phone-numeric characters) can be highlighted (e.g., bold, italics, varying font, varying color, varying style, . . . ). At 1008, a search can be performed based on a selected expansion. For instance, the suggested search queries can have embedded hyperlinks. Thus, a search can be initiated by a user clicking a suggested search query, which can take the user directly to a search page where the chosen suggested search query has been utilized for the search. For instance, any search browser can be utilized to display the search results.

Figure 11:
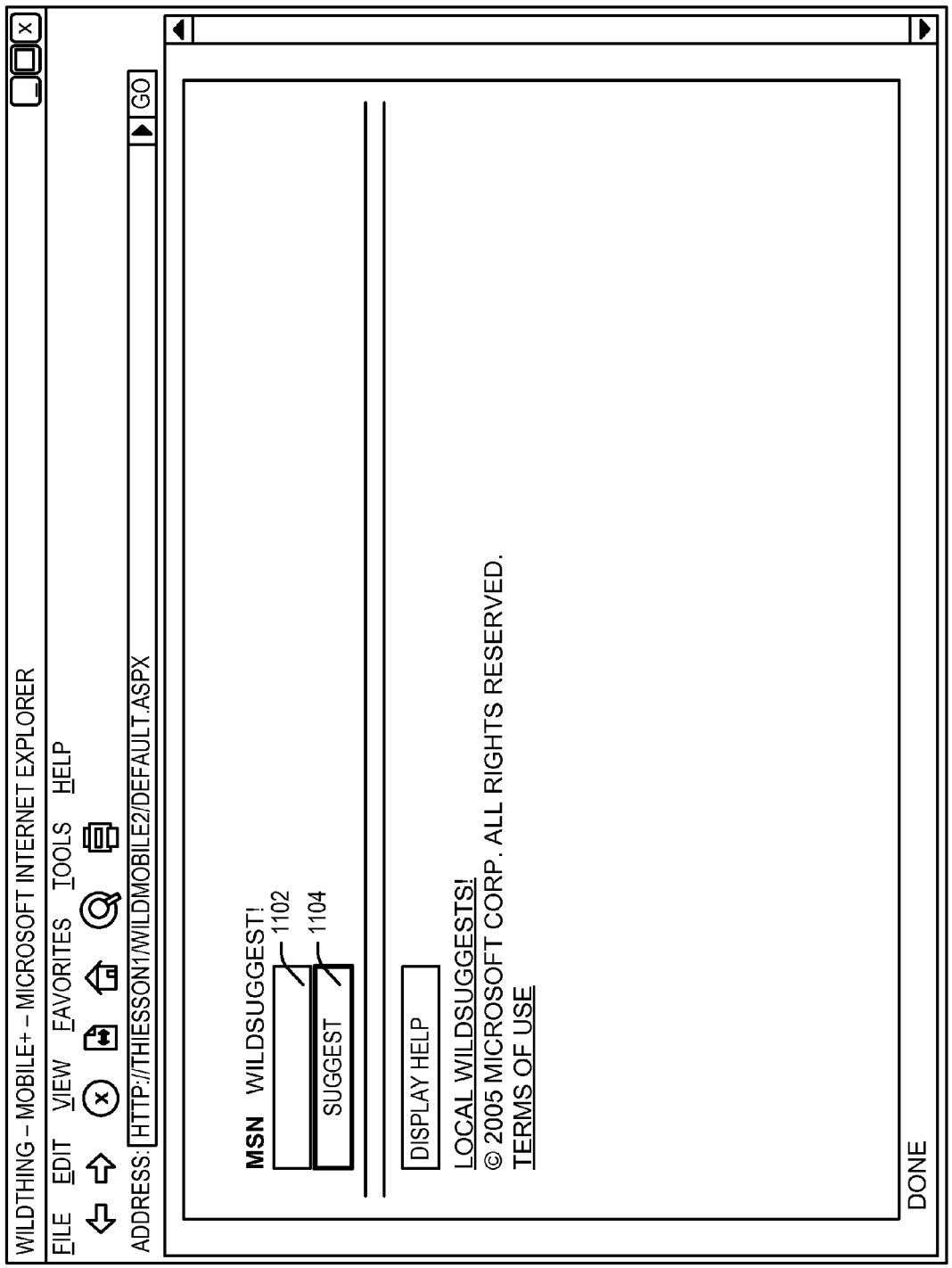
FIGS. 11-23 illustrate exemplary screen shots depicting various aspects in association with expanding wildcards.
Figure 12:
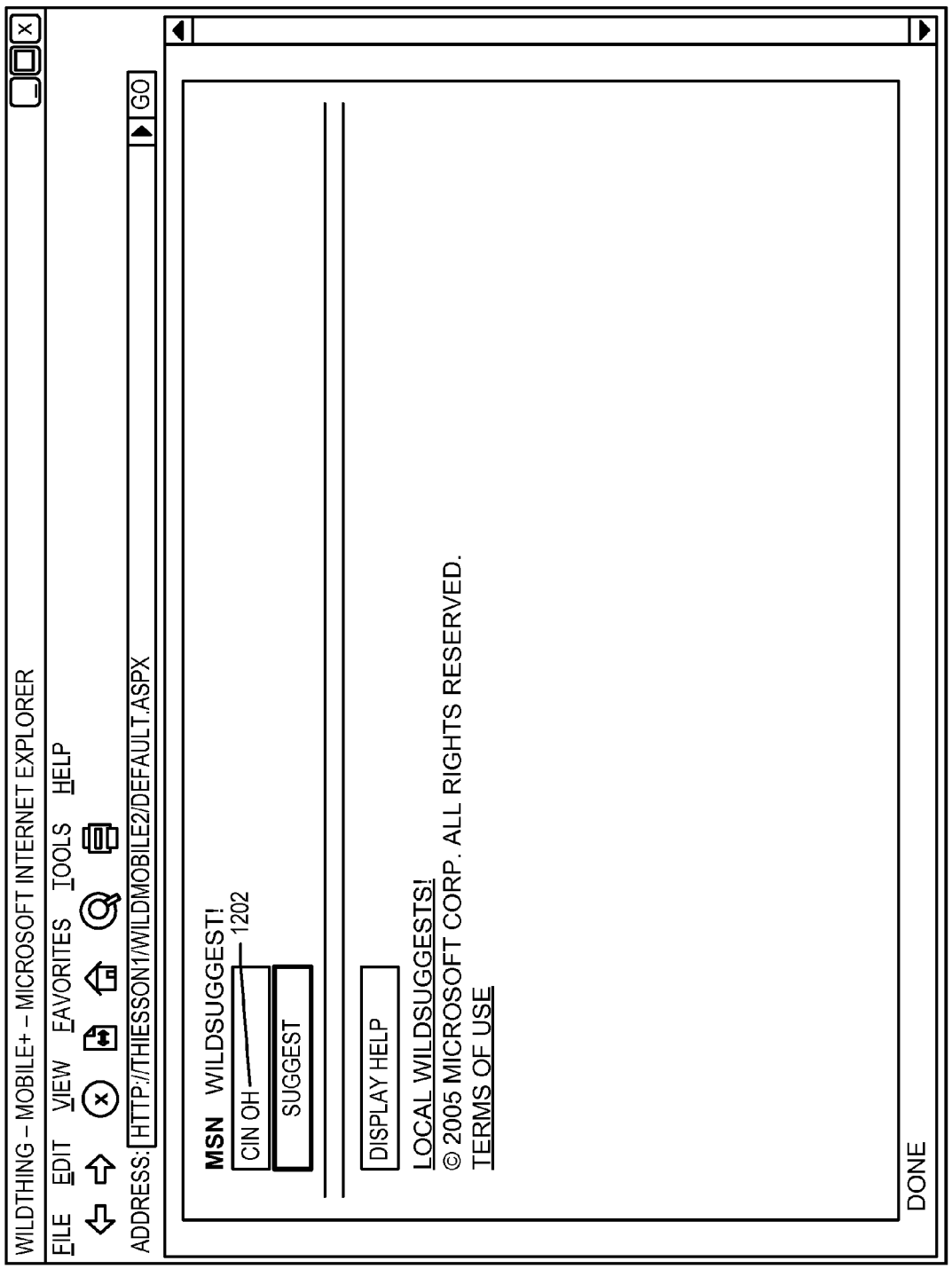
Figure 13:
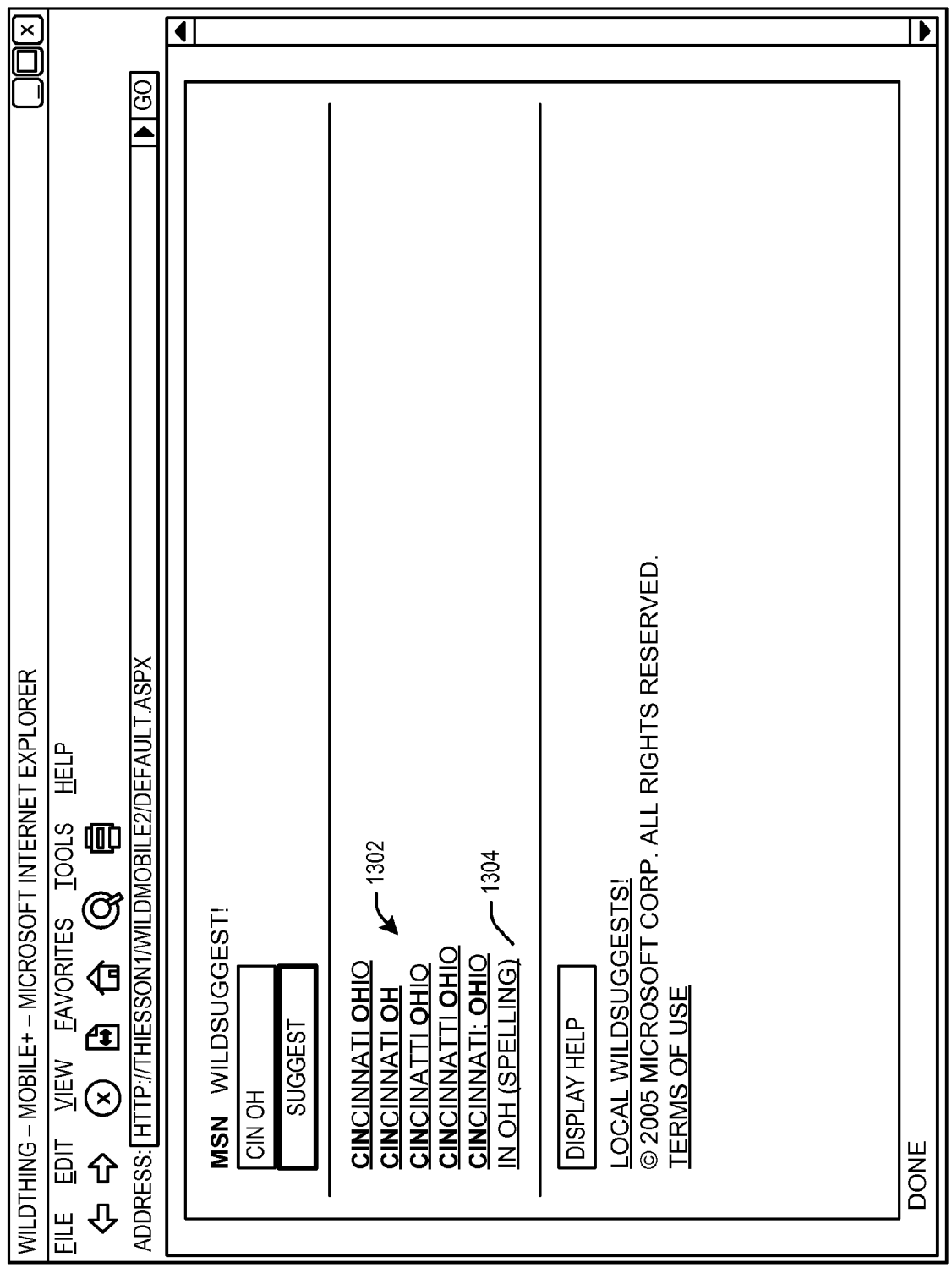
Figure 14:
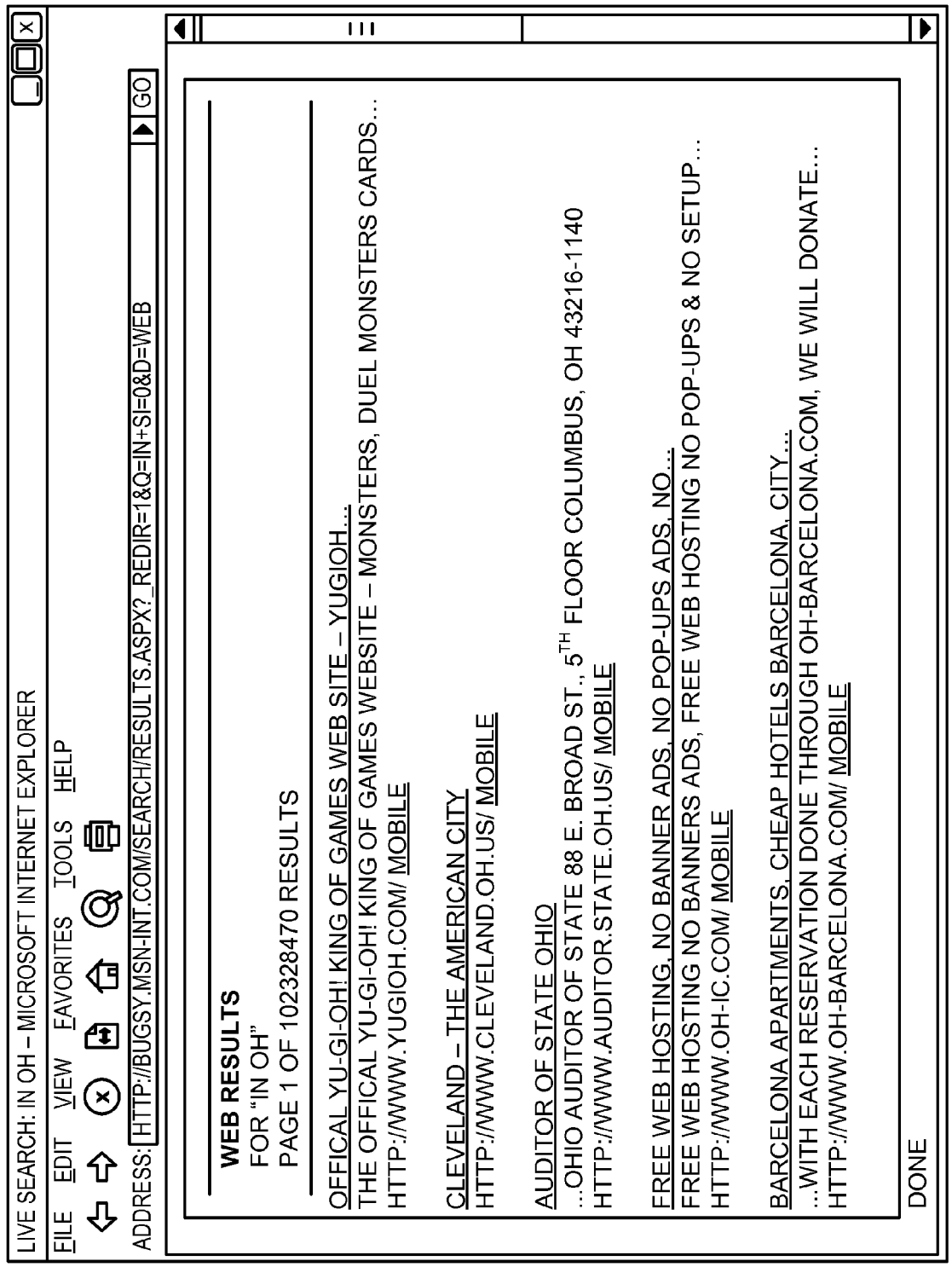
Figure 15:
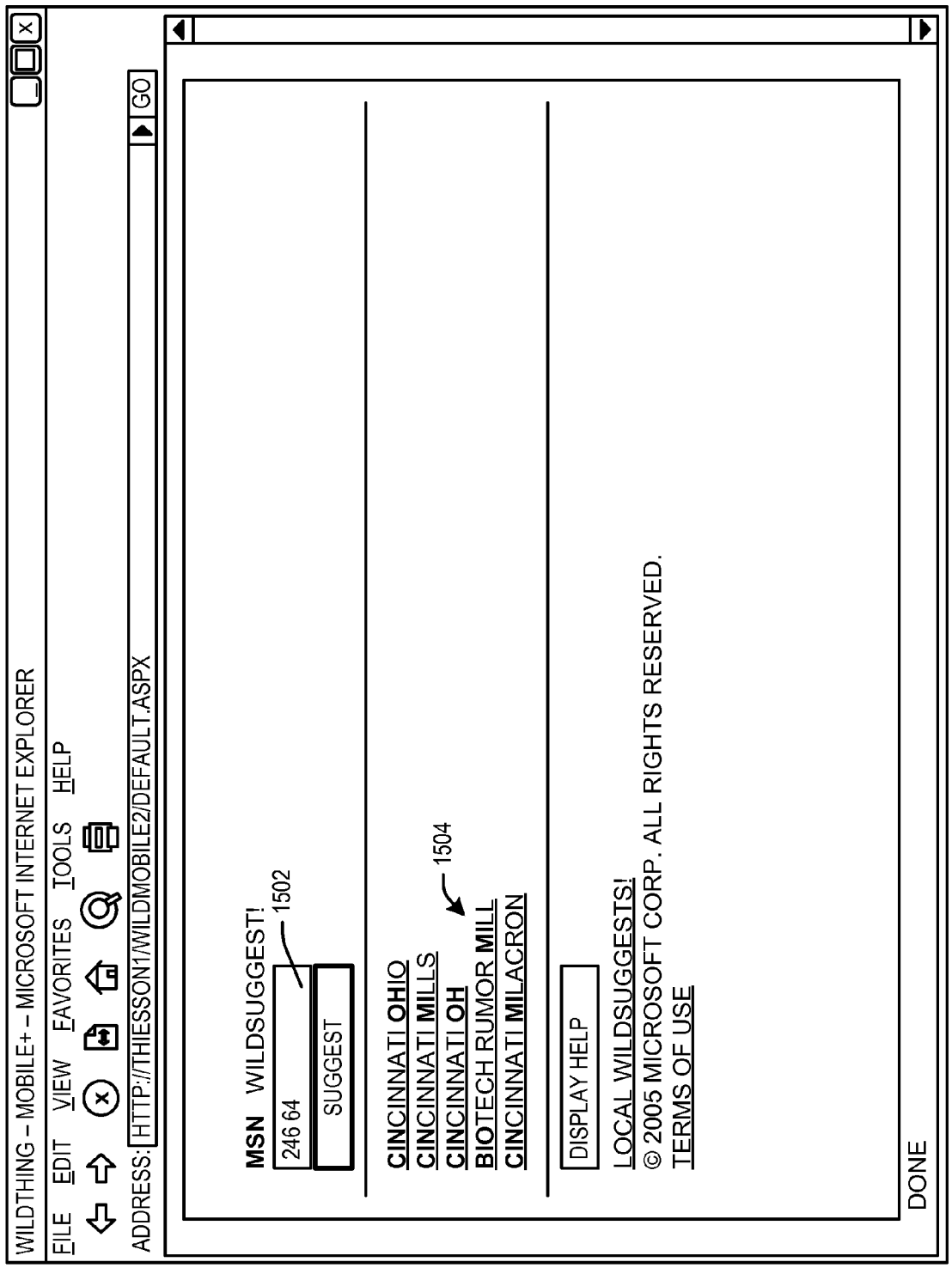

FIGS. 11-23 illustrate exemplary screen shots depicting various aspects in association with expanding wildcards. It is to be appreciated that these screenshots are provided as examples and the claimed subject matter is not so limited. With reference to FIGS. 11-15, illustrated are screen shots illustrating generation of expanded data from input data. FIG. 11 depicts a screen shot that includes an input data field 1102 and a suggest button 1104. In FIG. 12, illustrated is a screen shot depicting that input data 1202 (e.g., "cin oh") can be entered into the input data field. FIG. 13 illustrates a candidate list of expanded data 1302 associated with the input data that can be obtained upon pressing the suggest button. Additionally, an alternate spelling 1304 can be provided as part of the candidate list 1302. FIG. 14 depicts a screen shot associated with search results related to a selected expansion from the candidate list. FIG. 15 illustrates that numerical characters can be utilized as input data 1502 (e.g., utilizing a cellular telephone keypad). The numerical data can be disambiguated and/or expanded to generate an alphabetic candidate list 1504 related to the numerical input. As depicted in the example shown in FIG. 15, two of the candidates 1504 can be associated with the following disambiguation: "2" can represent "C", the first "4" can represent "I", the first "6" can represent "N", the second "6" can represent "O", and the second "4" can represent "H". The characters in the expansions within the candidate list 1504 that match the input data can be visually distinguishable (e.g., shown in bold, . . . ) from characters generates as part of an expansion.

Figure 16:
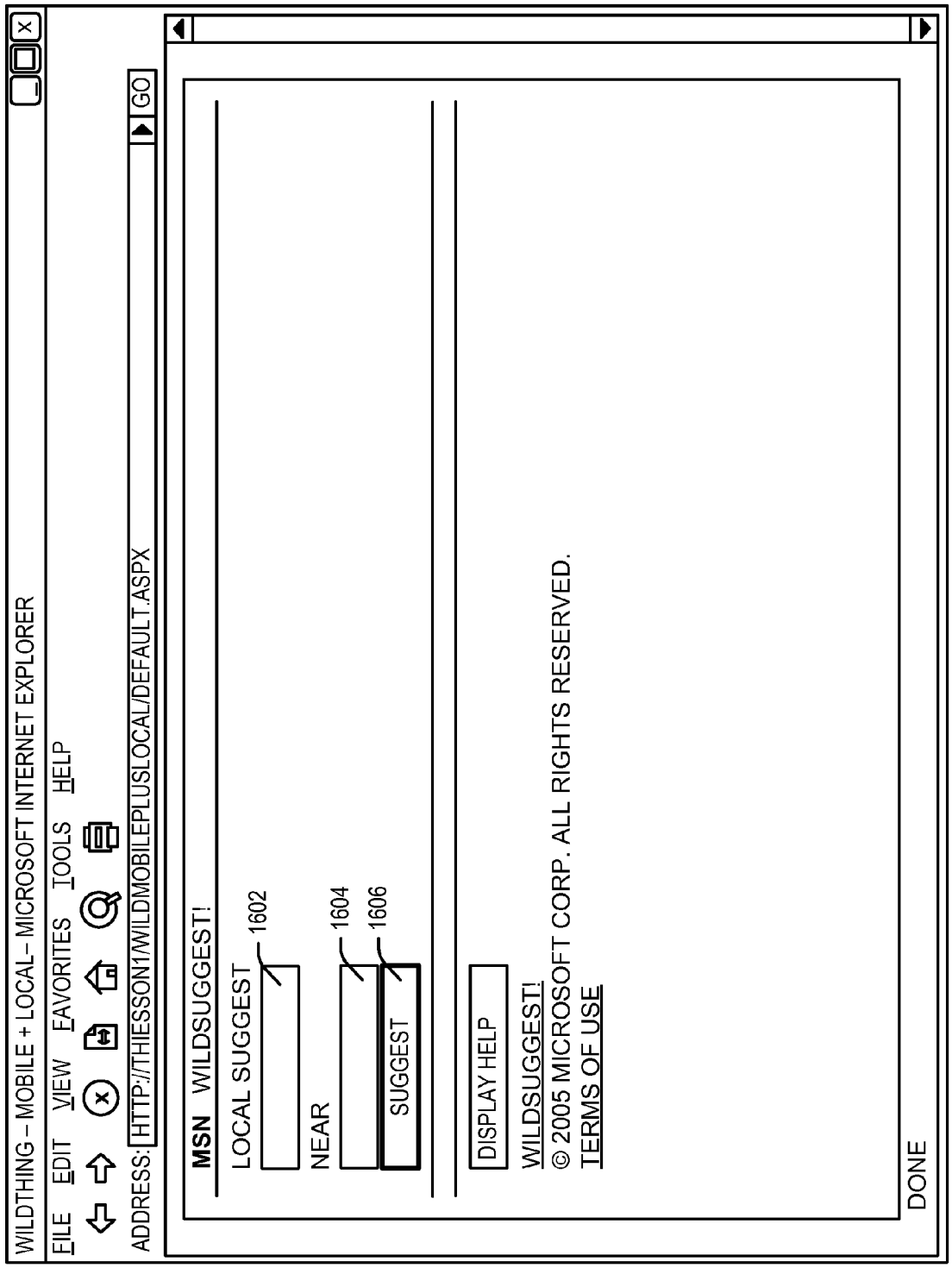
Figure 17:
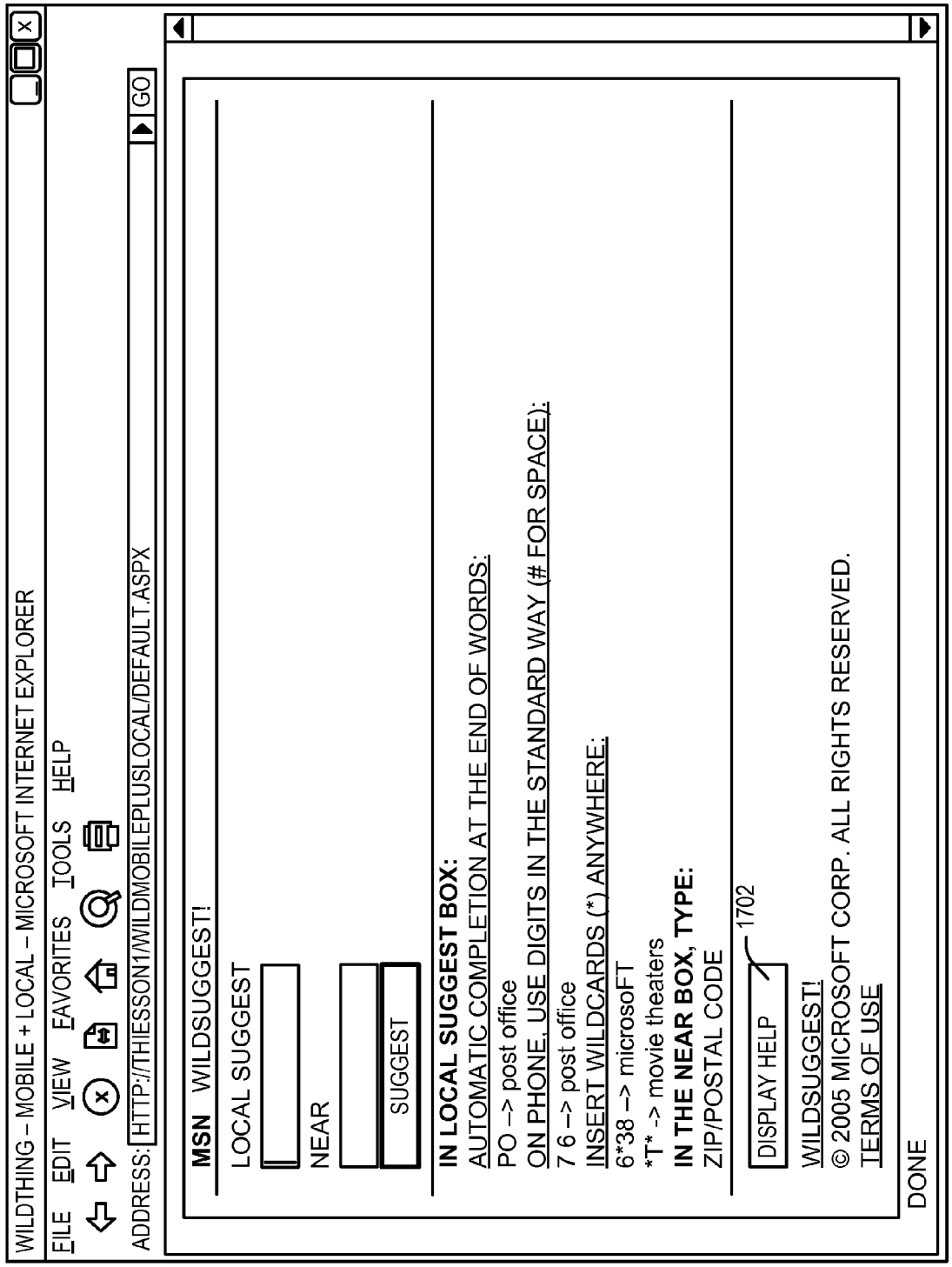
Figure 18:
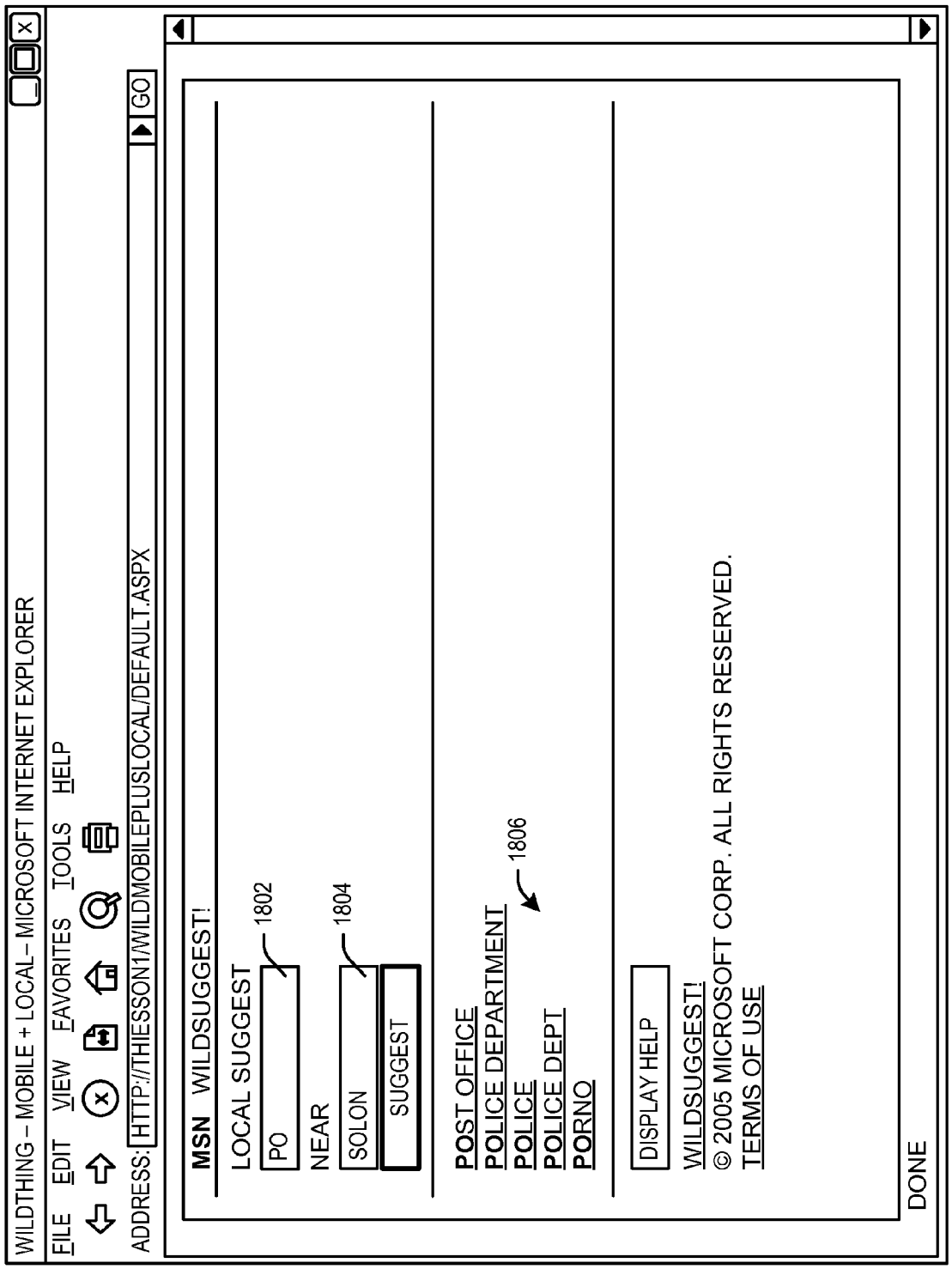
Figure 19:
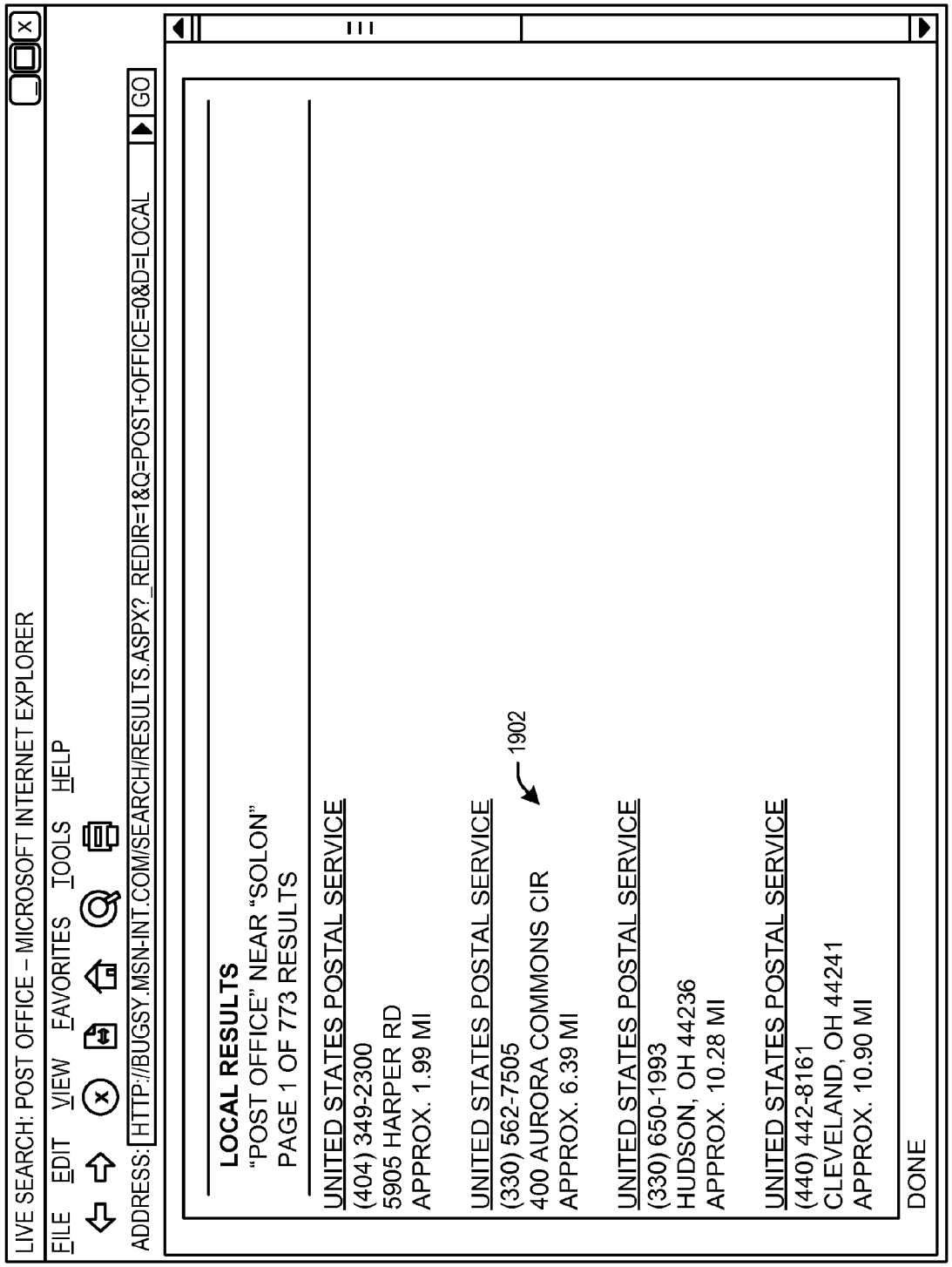
Figure 20:
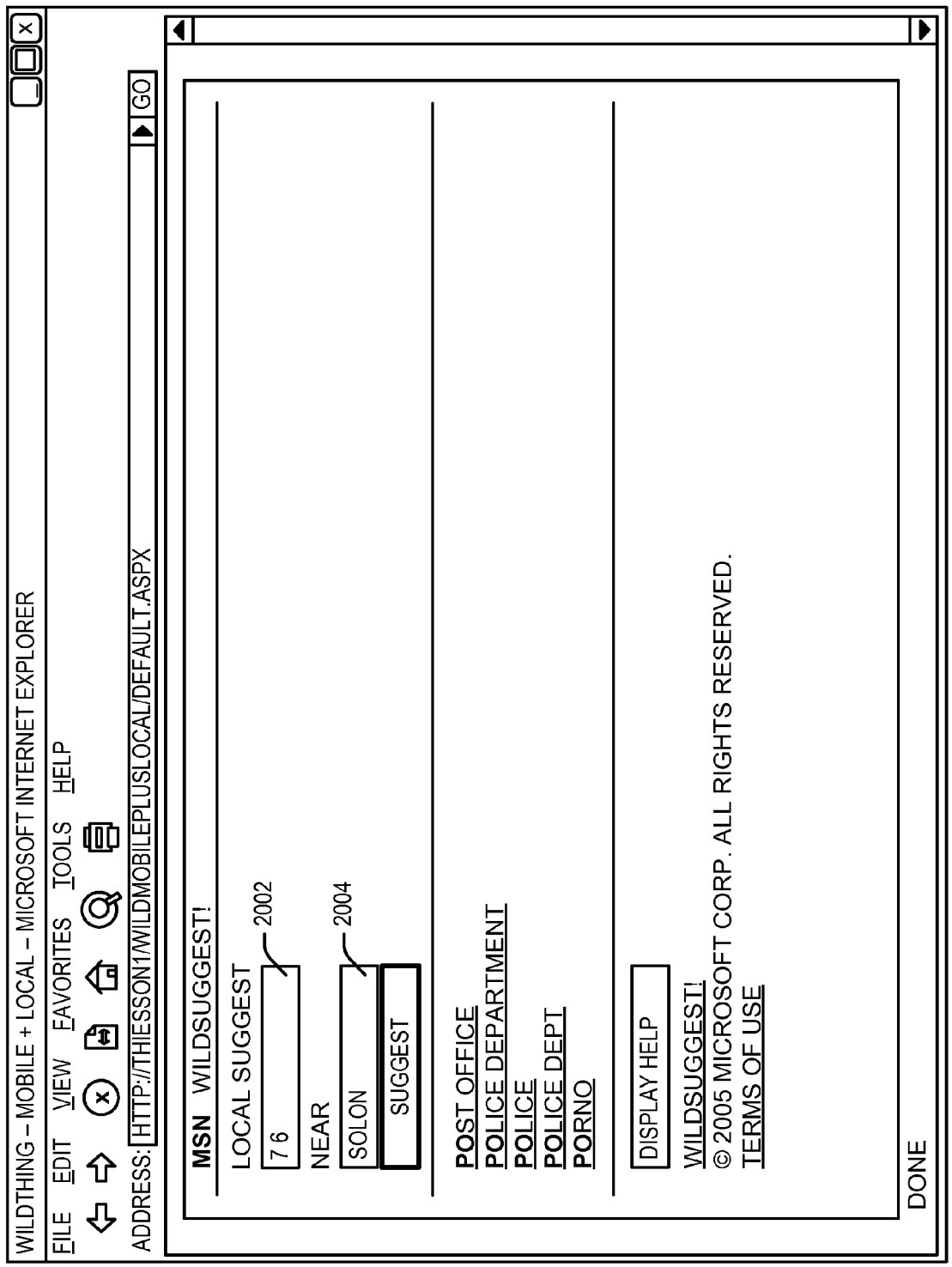
Figure 21:
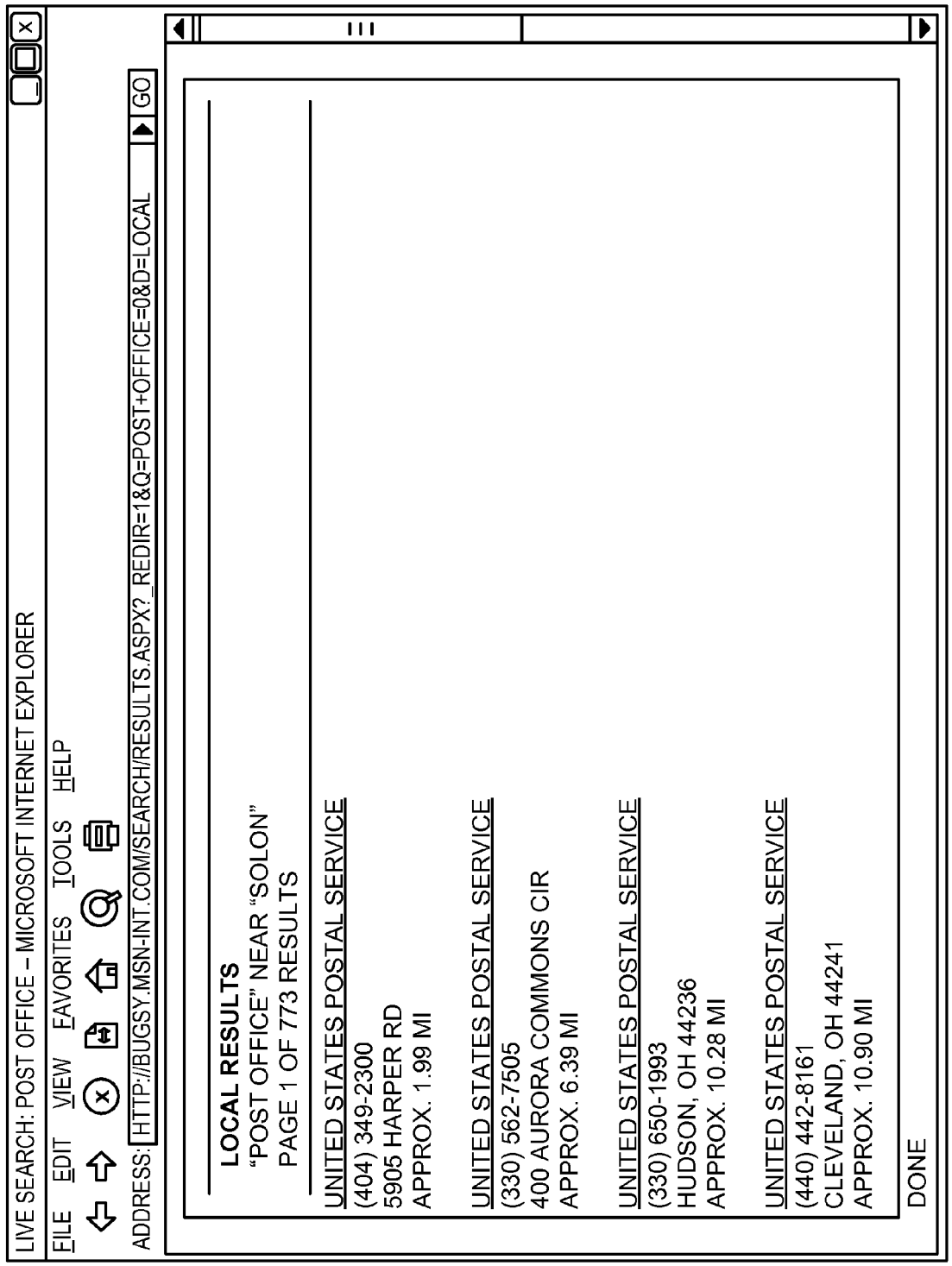
Figure 22:
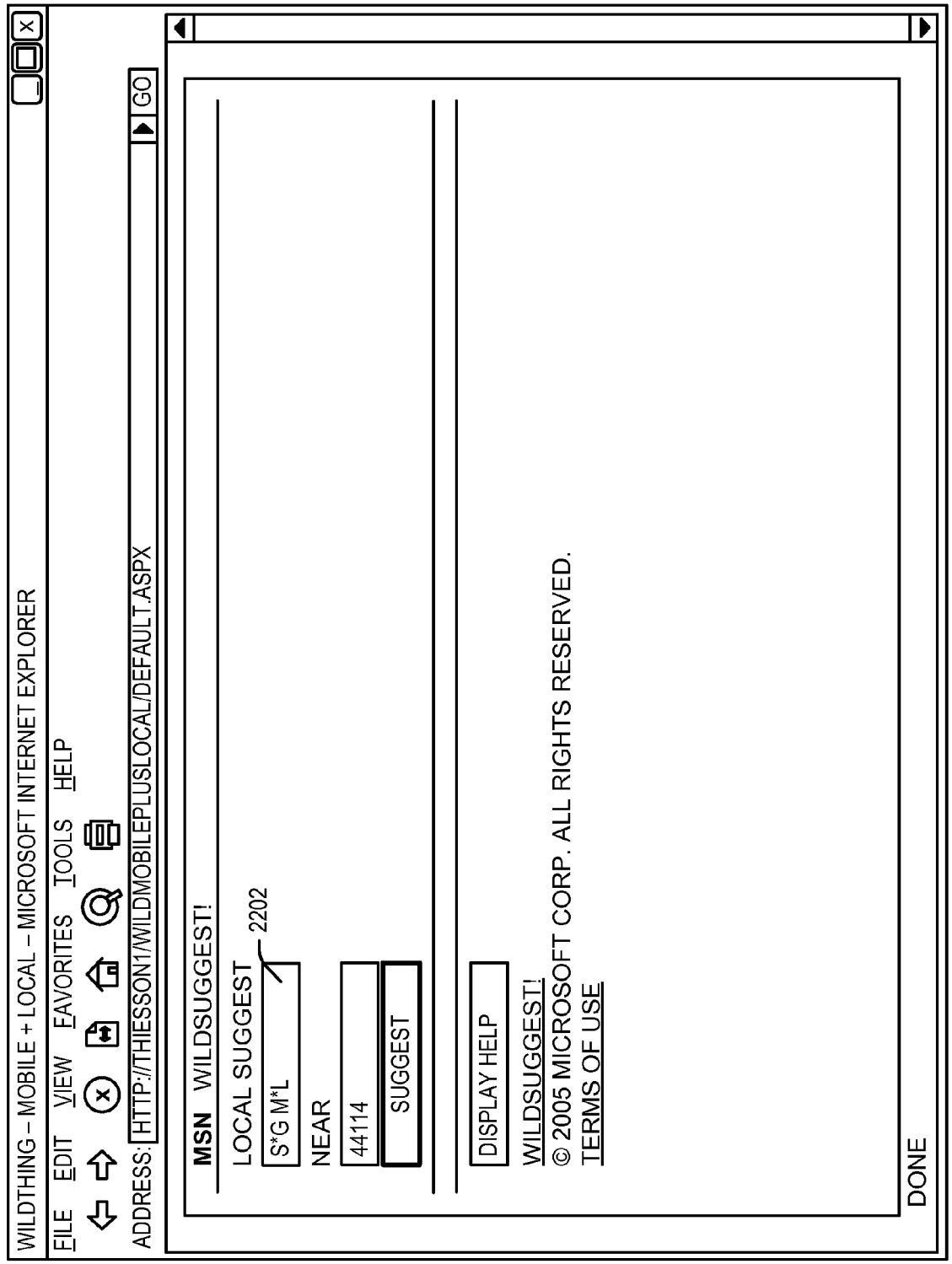
Figure 23:
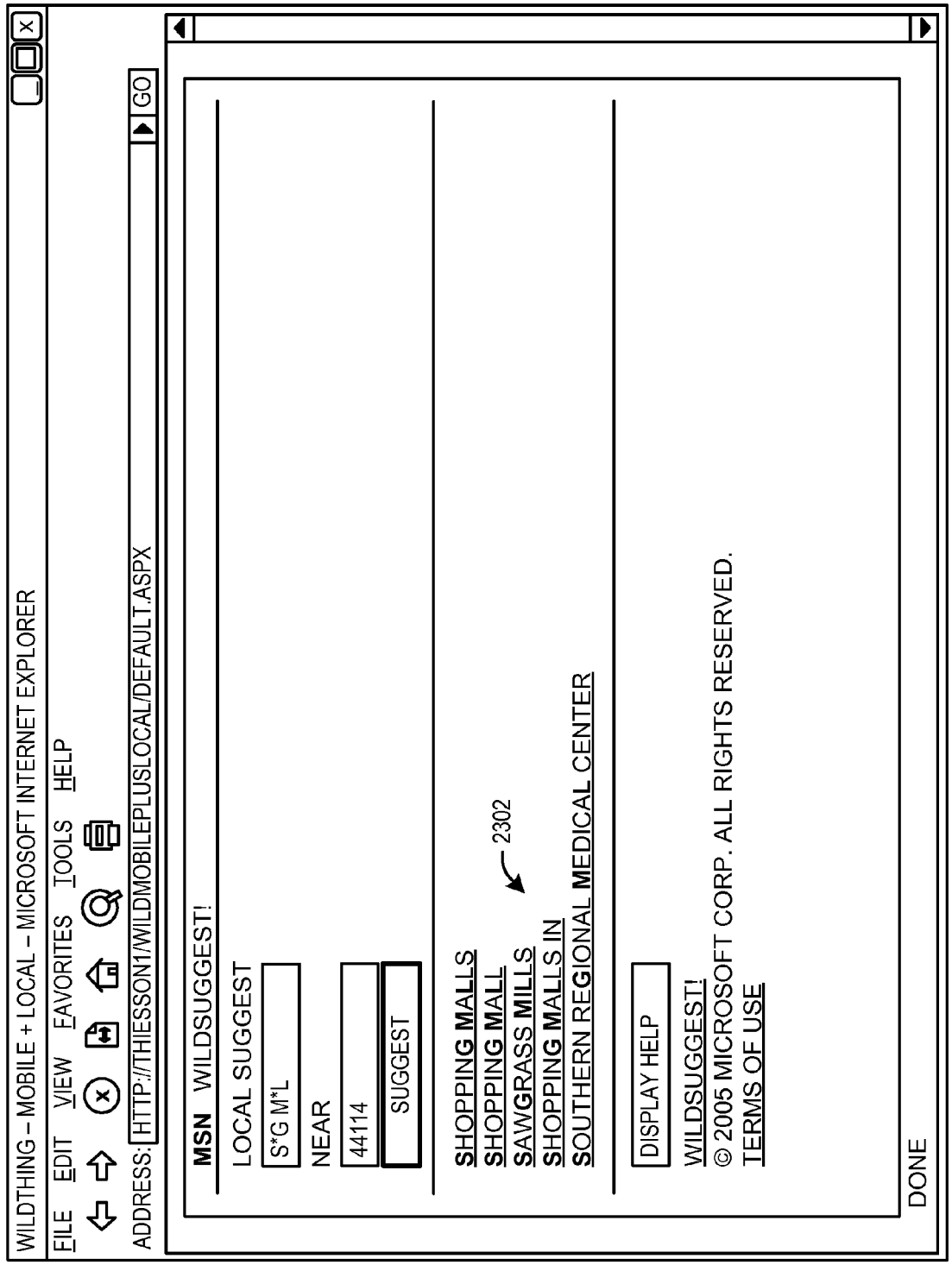

Turning to FIGS. 16-23, illustrated are exemplary screen shots related to generation of expanded data based at least in part upon a location. FIG. 16 illustrates a screen shot that includes an input data field 1602, a location field 1604, and a suggest button 1606. FIG. 17 illustrates a screen shot showing result that occurs when a display help button 1702 is pressed (e.g., example input syntax can be displayed). FIG. 18 shows a screen shot that includes input data 1802 (e.g., "po"), location data 1804 (e.g., "solon"), and a candidate list 1806 related to expansions of the input data that takes into consideration the location data. FIG. 19 depicts a screen shot that illustrates search results 1902 associated with selecting the "post office" hyperlink of FIG. 18. In particular, FIG. 19 includes local results that are ordered by a distance to the locale associated with the location data that was inputted. With reference to FIG. 20, illustrated is a screen shot where numerical data 2002 is input (e.g., "7 6") as well as location data 2004. The search results associated with selecting the hyperlink for "post office" are depicted in the screen shot of FIG. 21. FIG. 22 illustrates a screen shot that includes input data 2202 that comprises explicit wildcards (e.g., "s*g m*l). FIG. 23 depicts a candidate list 2302 associated with an expansion of the explicit and implicit wildcards related to the input data 2202 of FIG. 22.

Figure 24:
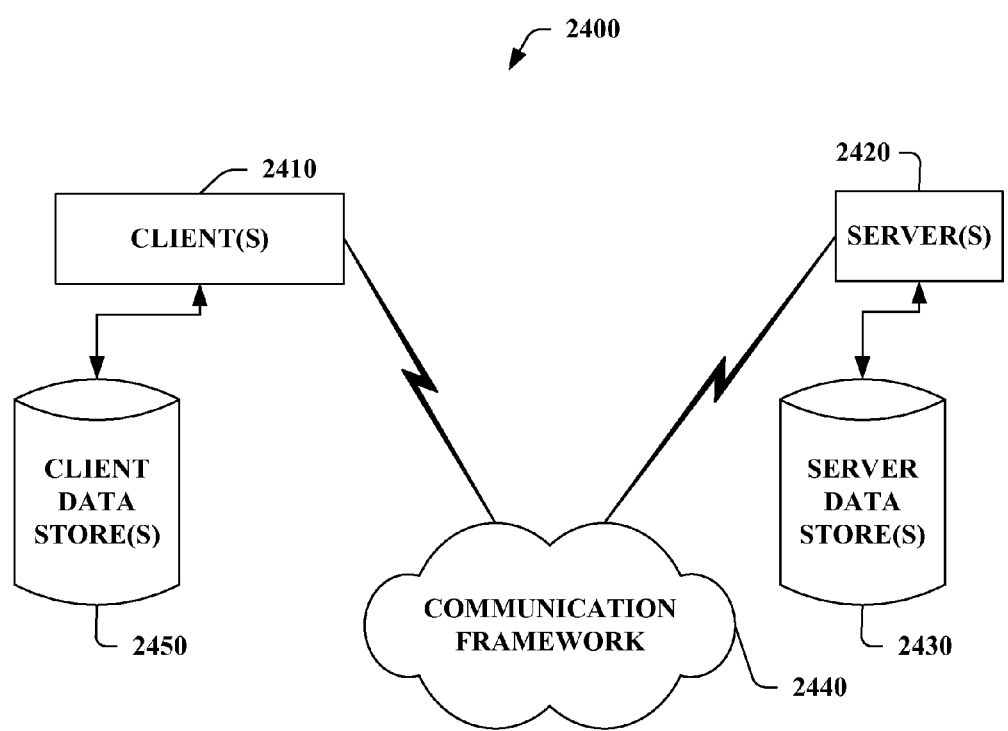
FIG. 24 illustrates an exemplary networking environment, wherein the novel aspects of the claimed subject matter can be employed.
Figure 25:
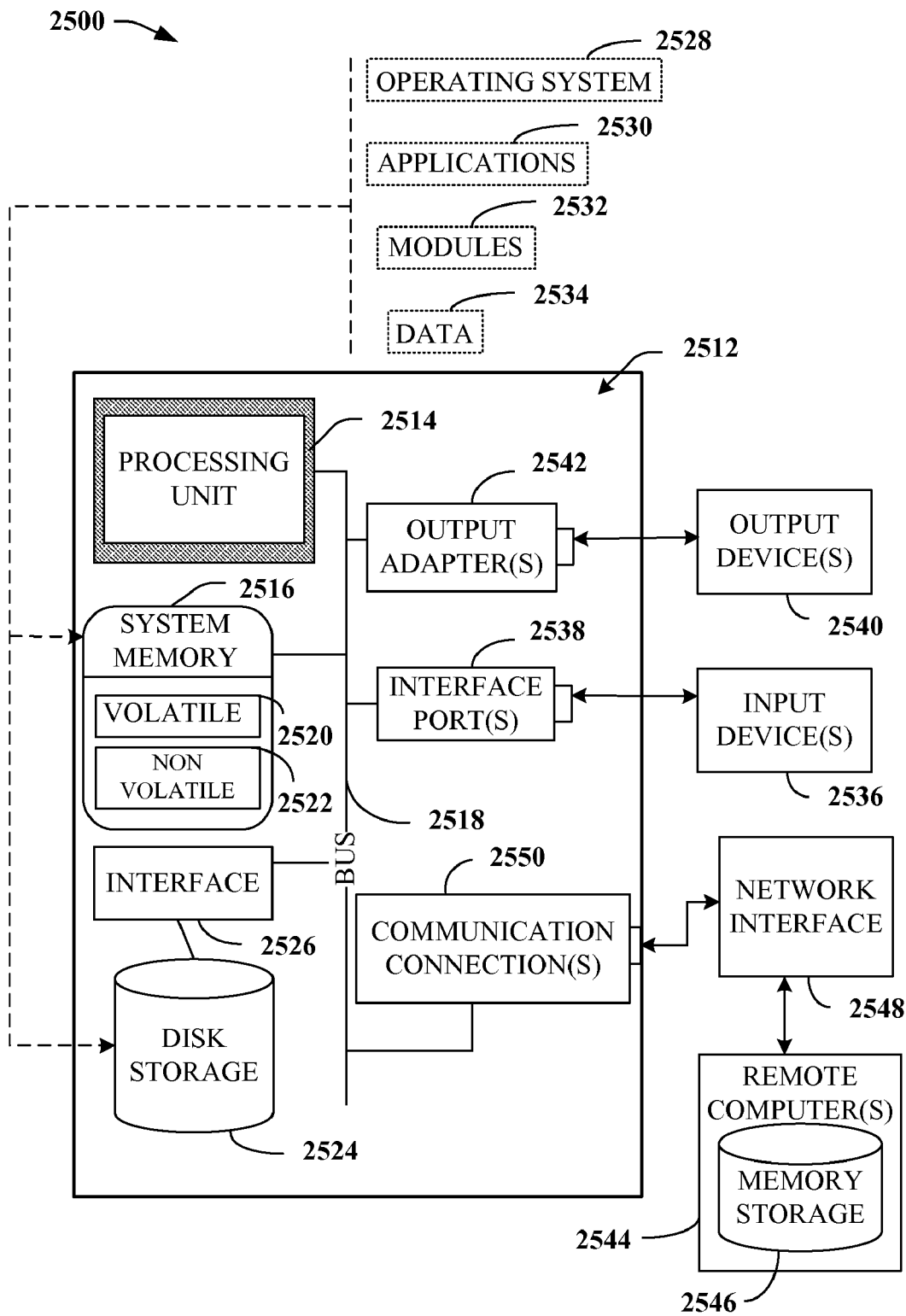
FIG. 25 illustrates an exemplary operating environment that can be employed in accordance with the claimed subject matter.

In order to provide additional context for implementing various aspects of the claimed subject matter, FIGS. 24-25 and the following discussion is intended to provide a brief, general description of a suitable computing environment in which the various aspects of the subject innovation may be implemented. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 24 is a schematic block diagram of a sample-computing environment 2400 with which the claimed subject matter can interact. The system 2400 includes one or more client(s) 2410. The client(s) 2410 can be hardware and/or software (e.g., threads, processes, computing devices). The system 2400 also includes one or more server(s) 2420. The server(s) 2420 can be hardware and/or software (e.g., threads, processes, computing devices). The servers 2420 can house threads to perform transformations by employing the subject innovation, for example.

One possible communication between a client 2410 and a server 2420 can be in the form of a data packet adapted to be transmitted between two or more computer processes. The system 2400 includes a communication framework 2440 that can be employed to facilitate communications between the client(s) 2410 and the server(s) 2420. The client(s) 2410 are operably connected to one or more client data store(s) 2450 that can be employed to store information local to the client(s) 2410. Similarly, the server(s) 2420 are operably connected to one or more server data store(s) 2430 that can be employed to store information local to the servers 2420.

With reference to FIG. 25, an exemplary environment 2500 for implementing various aspects of the claimed subject matter includes a computer 2512. The computer 2512 includes a processing unit 2514, a system memory 2516, and a system bus 2518. The system bus 2518 couples system components including, but not limited to, the system memory 2516 to the processing unit 2514. The processing unit 2514 can be any of various available processors. Dual microprocessors and other multiprocessor architectures also can be employed as the processing unit 2514.

The system bus 2518 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 2516 includes volatile memory 2520 and nonvolatile memory 2522. The basic input/output system (BIOS), containing the basic routines to transfer information between elements within the computer 2512, such as during start-up, is stored in nonvolatile memory 2522. By way of illustration, and not limitation, nonvolatile memory 2522 can include read only memory (ROM), programmable ROM (PROM), electrically programmable ROM (EPROM), electrically erasable programmable ROM (EEPROM), or flash memory. Volatile memory 2520 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 2512 also includes removable/non-removable, volatile/non-volatile computer storage media. FIG. 25 illustrates, for example a disk storage 2524. Disk storage 2524 includes, but is not limited to, devices like a magnetic disk drive, floppy disk drive, tape drive, Jaz drive, Zip drive, LS-100 drive, flash memory card, or memory stick. In addition, disk storage 2524 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 2524 to the system bus 2518, a removable or non-removable interface is typically used such as interface 2526.

It is to be appreciated that FIG. 25 describes software that acts as an intermediary between users and the basic computer resources described in the suitable operating environment 2500. Such software includes an operating system 2528. Operating system 2528, which can be stored on disk storage 2524, acts to control and allocate resources of the computer system 2512. System applications 2530 take advantage of the management of resources by operating system 2528 through program modules 2532 and program data 2534 stored either in system memory 2516 or on disk storage 2524. It is to be appreciated that the claimed subject matter can be implemented with various operating systems or combinations of operating systems.

A user enters commands or information into the computer 2512 through input device(s) 2536. Input devices 2536 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 2514 through the system bus 2518 via interface port(s) 2538. Interface port(s) 2538 include, for example, a serial port, a parallel port, a game port, and a universal serial bus (USB). Output device(s) 2540 use some of the same type of ports as input device(s) 2536. Thus, for example, a USB port may be used to provide input to computer 2512, and to output information from computer 2512 to an output device 2540. Output adapter 2542 is provided to illustrate that there are some output devices 2540 like monitors, speakers, and printers, among other output devices 2540, which require special adapters. The output adapters 2542 include, by way of illustration and not limitation, video and sound cards that provide a means of connection between the output device 2540 and the system bus 2518. It should be noted that other devices and/or systems of devices provide both input and output capabilities such as remote computer(s) 2544.

Computer 2512 can operate in a networked environment using logical connections to one or more remote computers, such as remote computer(s) 2544. The remote computer(s) 2544 can be a personal computer, a server, a router, a network PC, a workstation, a microprocessor based appliance, a peer device or other common network node and the like, and typically includes many or all of the elements described relative to computer 2512. For purposes of brevity, only a memory storage device 2546 is illustrated with remote computer(s) 2544. Remote computer(s) 2544 is logically connected to computer 2512 through a network interface 2548 and then physically connected via communication connection 2550. Network interface 2548 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 2550 refers to the hardware/software employed to connect the network interface 2548 to the bus 2518. While communication connection 2550 is shown for illustrative clarity inside computer 2512, it can also be external to computer 2512. The hardware/software necessary for connection to the network interface 2548 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system that evaluates wildcards, comprising:
an interface that receives input data at a server side, the input data is provided by a client component, the input data comprising at least one wildcard and at least one alphanumeric character;
a wildcard insertion component that evaluates the input data at the server side, the wildcard insertion component inserting at least one implicit wildcard into predefined locations of the input data in addition to the wildcard, the wildcard and the implicit wildcard comprising non-alphanumeric characters; and
an expansion component that evaluates the input data from the wildcard insertion component at the server side utilizing a language model to produce a set of expansions where the wildcard and the implicit wildcard are replaced with additional alphanumeric characters for at least one of the expansions of the set.

2. The system of claim 1, wherein the expansion component employs a suffix tree to produce the set of expansions.

3. The system of claim 2, wherein the suffix tree includes suffixes sorted by popularity and alphabetic order.

4. The system of claim 1, wherein the interface further receives a short message service (SMS) message containing the input data from the client component; and wherein the expansion component evaluates the received SMS message and provides a return SMS message to the client component that includes n-best search results for the m-best expansions.

5. The system of claim 1, further comprising a local context component that provides expansions relevant to location data of the client component obtained from the client component.

6. The system of claim 5, wherein the local context component utilizes a language model that increases a likelihood of expansions related to places and decreases a likelihood of expansions related to people.

7. The system of claim 5, further comprising a search component that generates results corresponding to the location data for a selected expansion.

8. The system of claim 1, further comprising a filter component that filters a particular expansion from the set based on at least one of a nature of the particular expansion and a nature of a search result associated with the particular expansion.

9. The system of claim 1, further comprising a personalization component that utilizes a particular user's preferences and historical data to generate a personalized set of expansions.

10. The system of claim 1, further comprising a rank component that provides an order for the expansions in the set based at least in part upon a likelihood corresponding to each of the expansions.

11. The system of claim 1, further comprising an embedding component that includes results from a search associated with a most likely expansion from the set along with the set of expansions.

12. The system of claim 1, wherein the predefined locations comprise ends of intended words as identified by a space following each of the intended words.

13. A computer-implemented method that facilitates evaluating a wildcard associated with input data, the method comprising computer-implemented operations for:
obtaining input data at a server from a client, the input data comprising at least one explicit wildcard and at least one alphanumeric character;
inserting at the server at least one implicit wildcard input data, the explicit wildcard and the implicit wildcard comprising non-alphanumeric characters;
generating expansions of the explicit wildcard and the implicit wildcard interspersed within the input data utilizing a language model by replacing the explicit wildcard and the implicit wildcard with additional alphanumeric characters; and
creating an order for the expansions in a candidate list that is provided to the client.

14. The computer-implemented method of claim 13, further comprising performing a search based upon a selected expansion from the candidate list.

15. The computer-implemented method of claim 13, creating the order further comprises ordering the expansions based on at least one of a popularity and an alphabetic order.

16. The computer-implemented method of claim 13, further comprising displaying the candidate list such that characters in the expansions that match the input data are visibly distinct from characters that replace the at least one wildcard.

17. The computer-implemented method of claim 13, further comprising filtering a particular expansion from the candidate list based on at least one of a nature of the particular expansion and a nature of a search result associated with the particular expansion.

18. The computer-implemented method of claim 13, further comprising receiving a short message service (SMS) message that includes the input data and transmitting a return SMS message that includes at least one of the candidate list and the n-best search results for the m-best expansions.

19. A system that evaluates a wildcard and performs a search, comprising:
means for receiving input data at a server from a client, the input data comprising at least one explicit wildcard and at least one alphanumeric character;
means for inserting at the server at least one implicit wildcard input data, the explicit wildcard and the implicit wildcard comprising non-alphanumeric characters;
means for generating expansions of the explicit wildcard and the implicit wildcard intermixed in the input data utilizing a language model by replacing the explicit wildcard and the implicit wildcard with additional alphanumeric characters; and
means for performing a search based at least in part upon a particular one of the expansions.

20. A system for evaluating wildcards, comprising:
an interface that receives input data at a server side, the input data is provided by a client component, the input data comprising at least one explicit wildcard and at least one alphanumeric character;
a wildcard insertion component that inserts at least one implicit wildcard into the input data in addition to the wildcard, the explicit wildcard and the implicit wildcard comprising non-alphanumeric characters;
an expansion component that evaluates the input data at the server side utilizing a language model to produce a set of expansions where the explicit wildcard and the implicit wildcard located in a midst of the input data are replaced with additional alphanumeric characters for at least one of the expansions of the set;
a local context component that provides expansions relevant to location data of the client component obtained from the client component;
a search component that generates results corresponding to the location data for a selected expansion;

a filter component that filters a particular expansion from the set based on at least one of a nature of the particular expansion and a nature of a search result associated with the particular expansion;

a personalization component that utilizes a particular user's preferences and historical data to generate a personalized set of expansions;

a rank component that provides an order for the expansions in the set based at least in part upon a likelihood corresponding to each of the expansions; and an embedding component that includes results from a search associated with a most likely expansion from the set along with the set of expansions.

21. The system of claim 20, wherein the language model is a trigram language model.

22. The system of claim 20, wherein the language model is based on web queries.

23. The system of claim 20, wherein the language model is based on syllabic elements.

* * * * *